Figure 1:
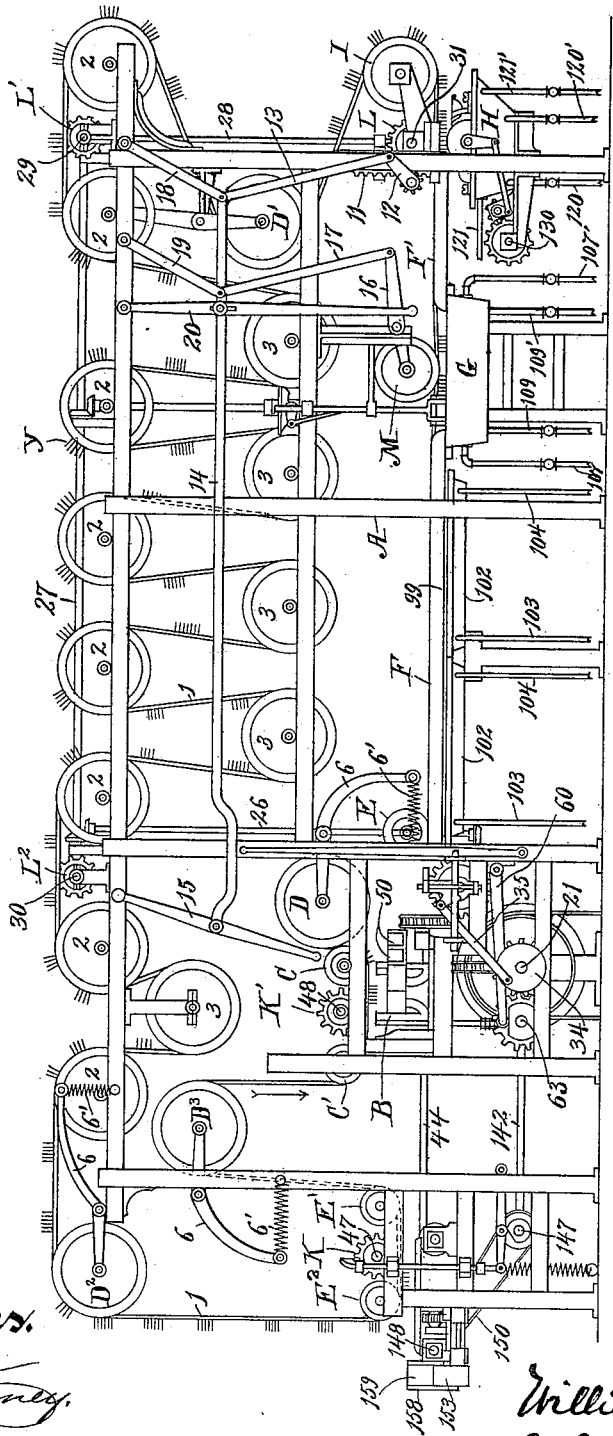

No. 621,886. Patented Mar. 28, 1899.
W. H. WUSSOW.
MATCH MACHINE.
(Application filed May 19, 1898.)
(No Model.) 25 Sheets—Sheet 1.

Witnesses.
Inventor.
William H. Wussow
By Benedict & Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 2.

No. 621,886. Patented Mar. 28, 1899.
W. H. WUSSOW.
MATCH MACHINE.
(Application filed May 19, 1898.)
(No Model.) 25 Sheets—Sheet 5.

Witnesses. Inventor.
William H. Wussow
By Benedict & Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 6.

Witnesses. Inventor
William H. Wussow
By Benedict Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 7.

Witnesses.

Inventor.
William H. Wussow
By Benedict & Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 8.

Witnesses.
C. H. Keeney.
Anna V. Faust.

Inventor.
William H. Wussow
By Benedict & Morsell
Attorneys.

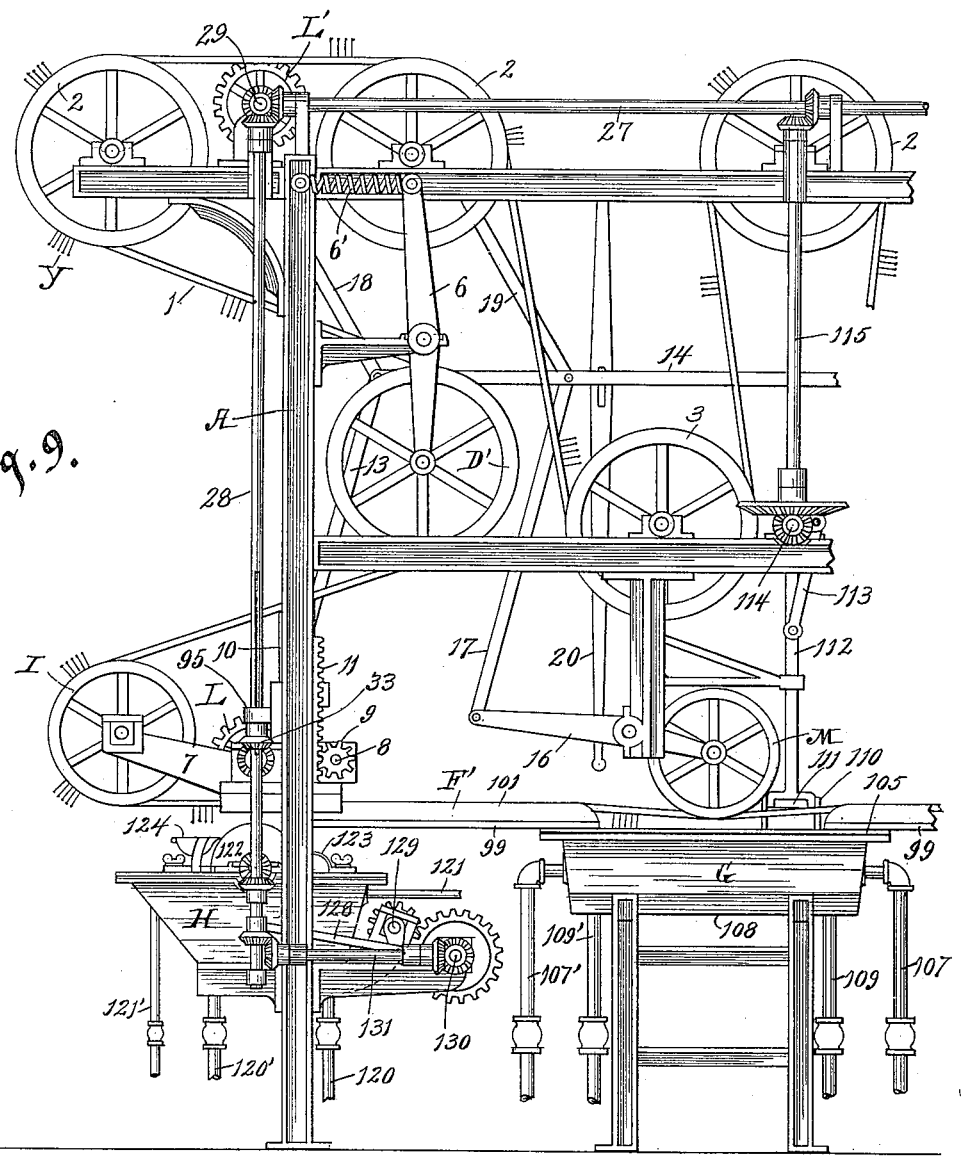

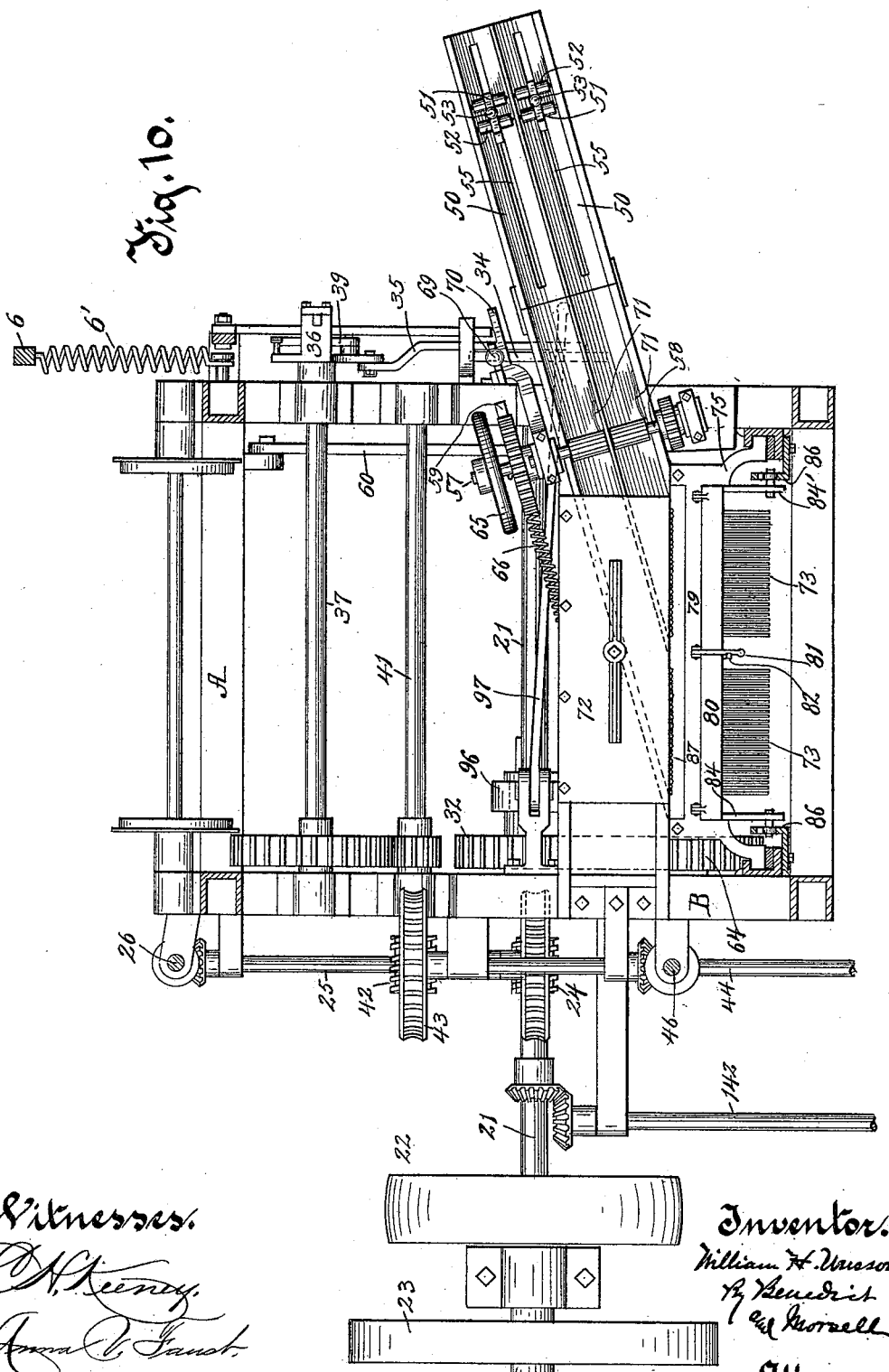

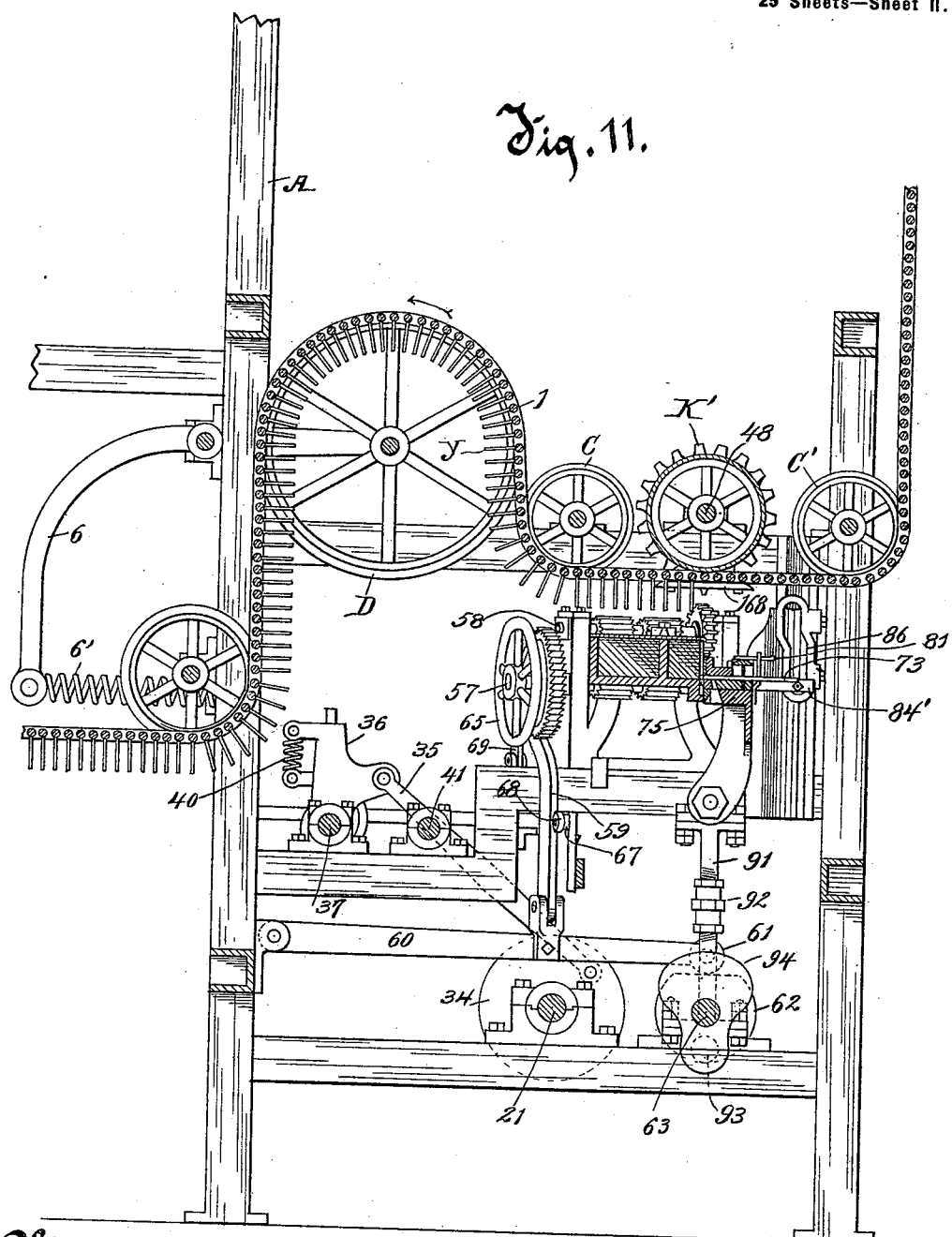

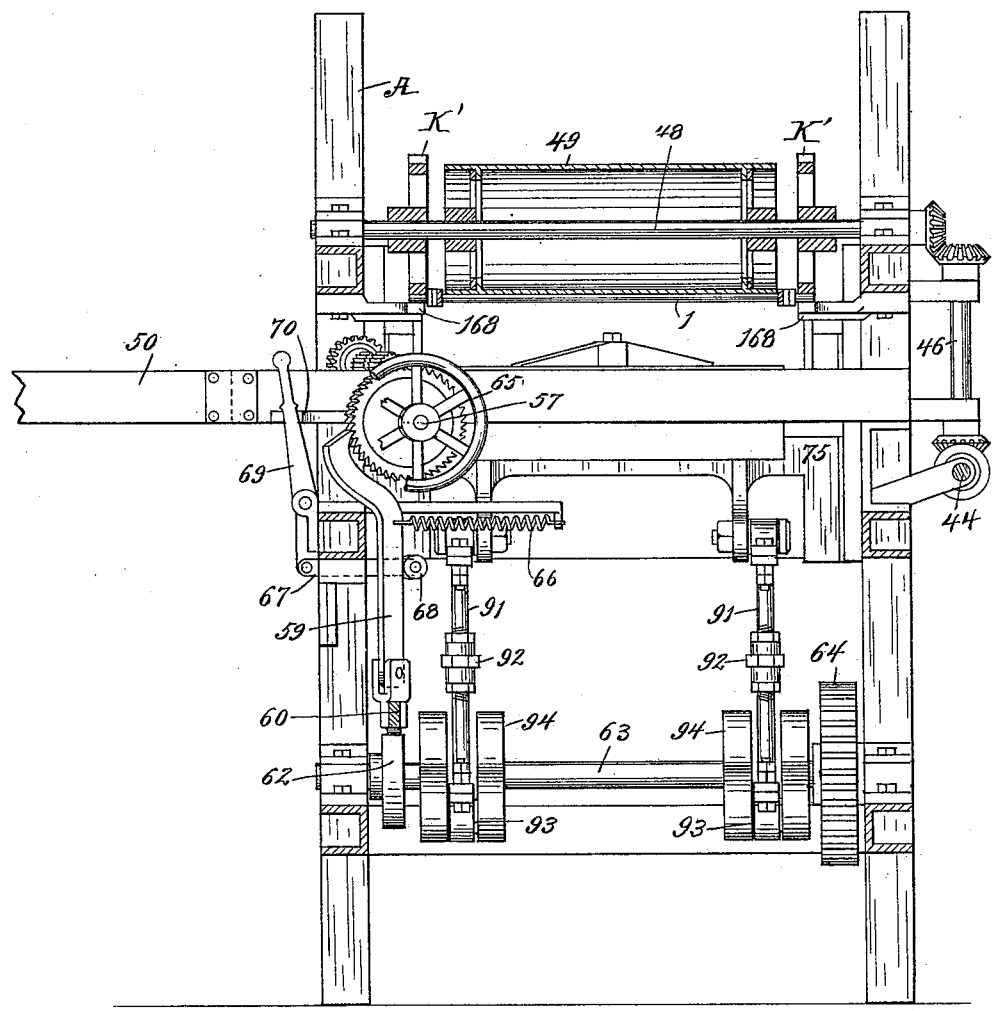

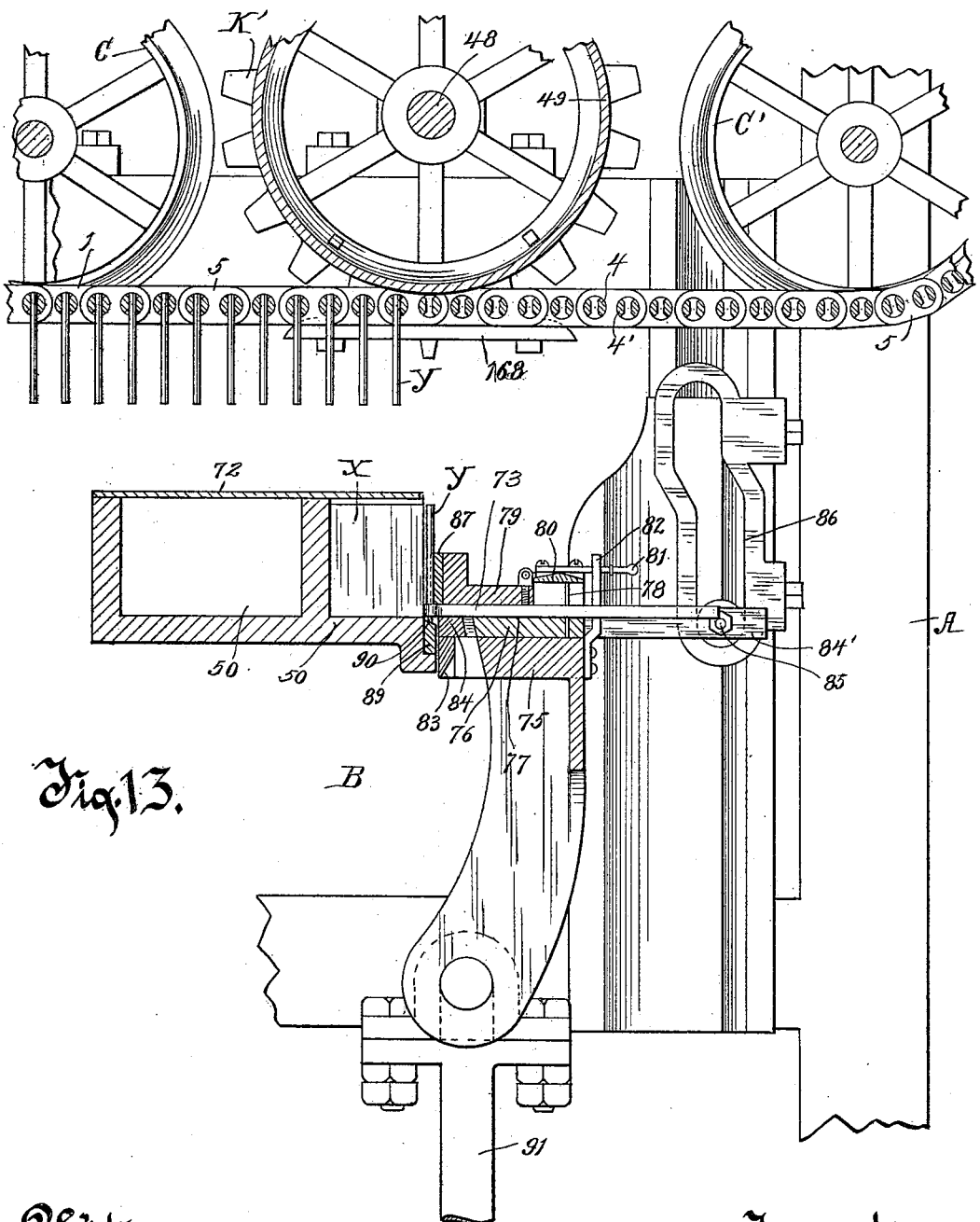

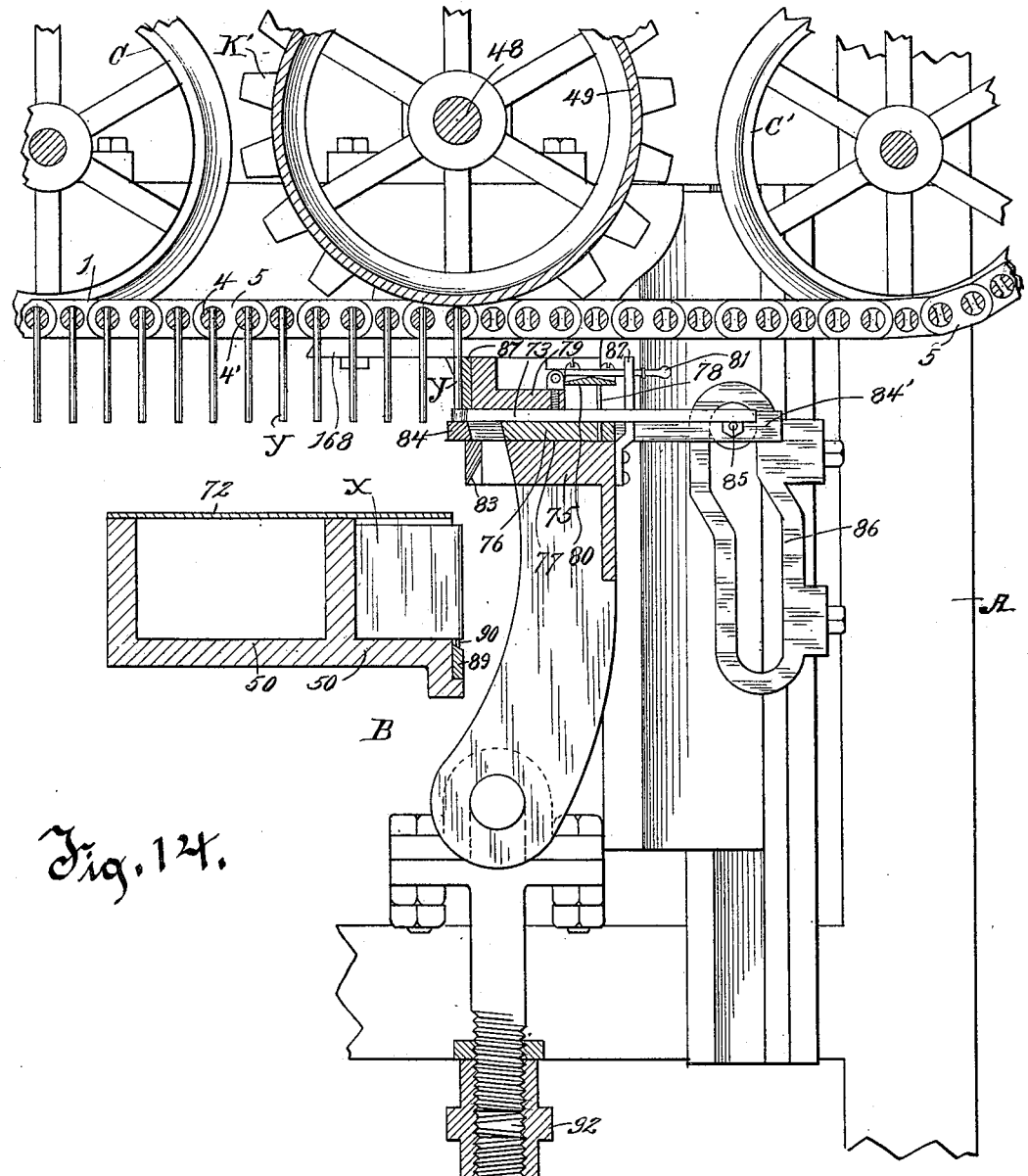

No. 621,886. Patented Mar. 28, 1899.
W. H. WUSSOW.
MATCH MACHINE.
(Application filed May 19, 1898.)
(No Model.) 25 Sheets—Sheet 15.
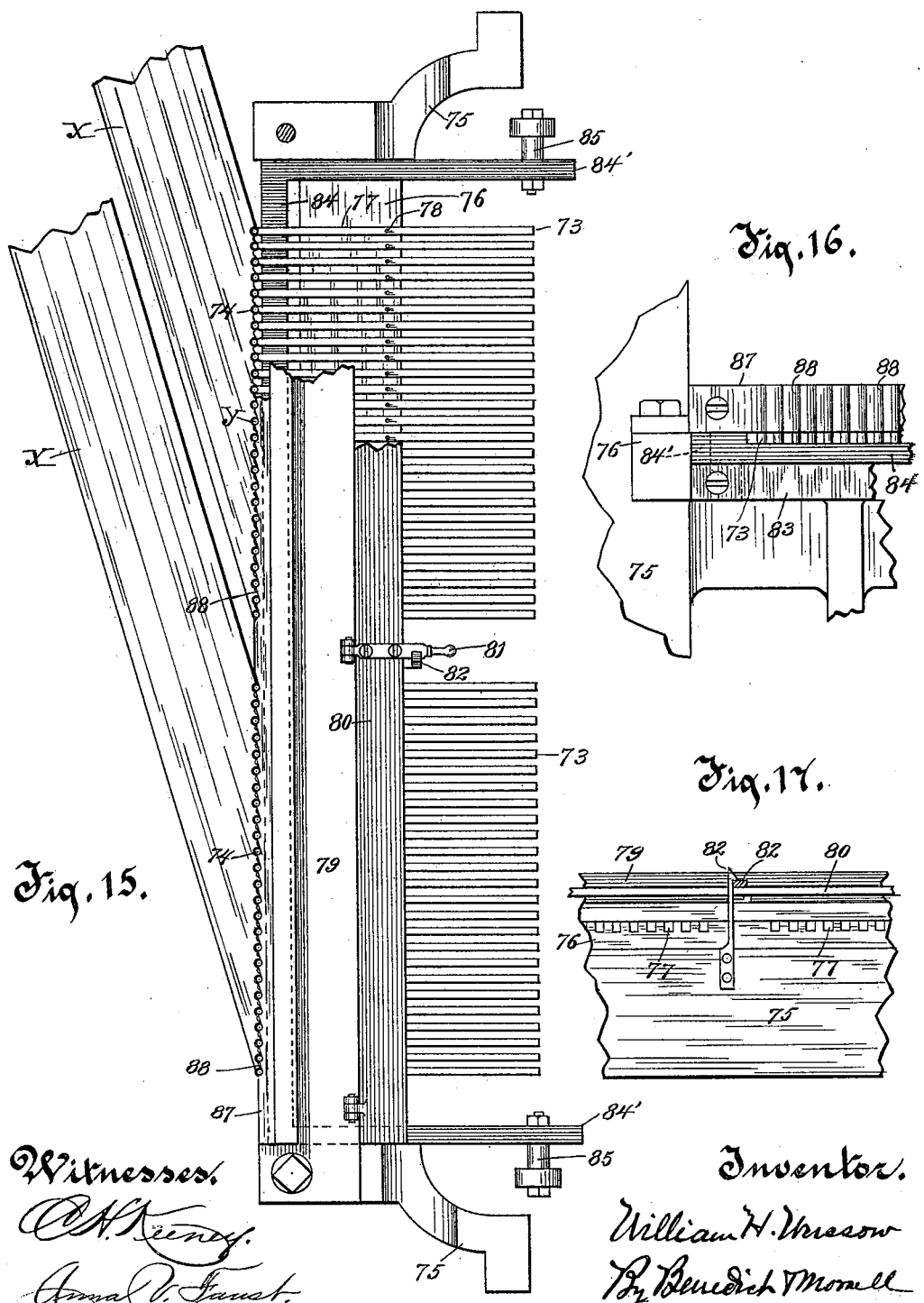

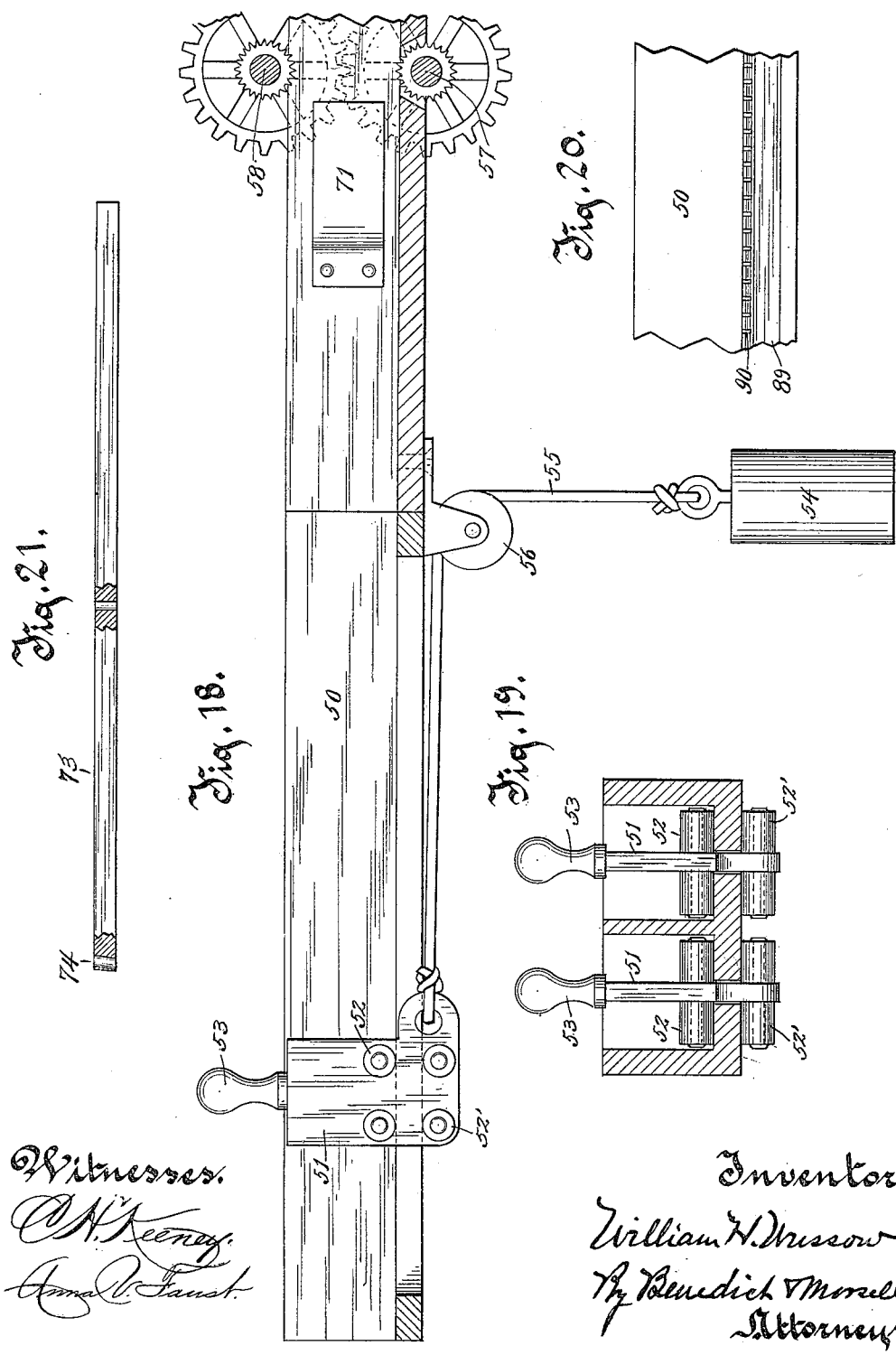

No. 621,886. Patented Mar. 28, 1899.
W. H. WUSSOW.
MATCH MACHINE.
(Application filed May 19, 1898.)
(No Model.) 25 Sheets—Sheet 17.

Witnesses. Inventor.
William H. Wussow
By Benedict & Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 18.

Witnesses. Inventor.
William H. Wussow

No. 621,886. Patented Mar. 28, 1899.
W. H. WUSSOW.
MATCH MACHINE.
(Application filed May 19, 1898.)
(No Model.) 25 Sheets—Sheet 19.

Witnesses. Inventor.
William H. Wussow
By Benedict & Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 20.

Witnesses. Inventor.
William H. Wussow
By Benedict & Morsell
Attorneys.

No. 621,886. Patented Mar. 28, 1899.
W. H. WUSSOW.
MATCH MACHINE.
(Application filed May 19, 1898.)
(No Model.) 25 Sheets—Sheet 21.

Witnesses. Inventor.
William H. Wussow
By Benedict & Morsell
Attorneys.

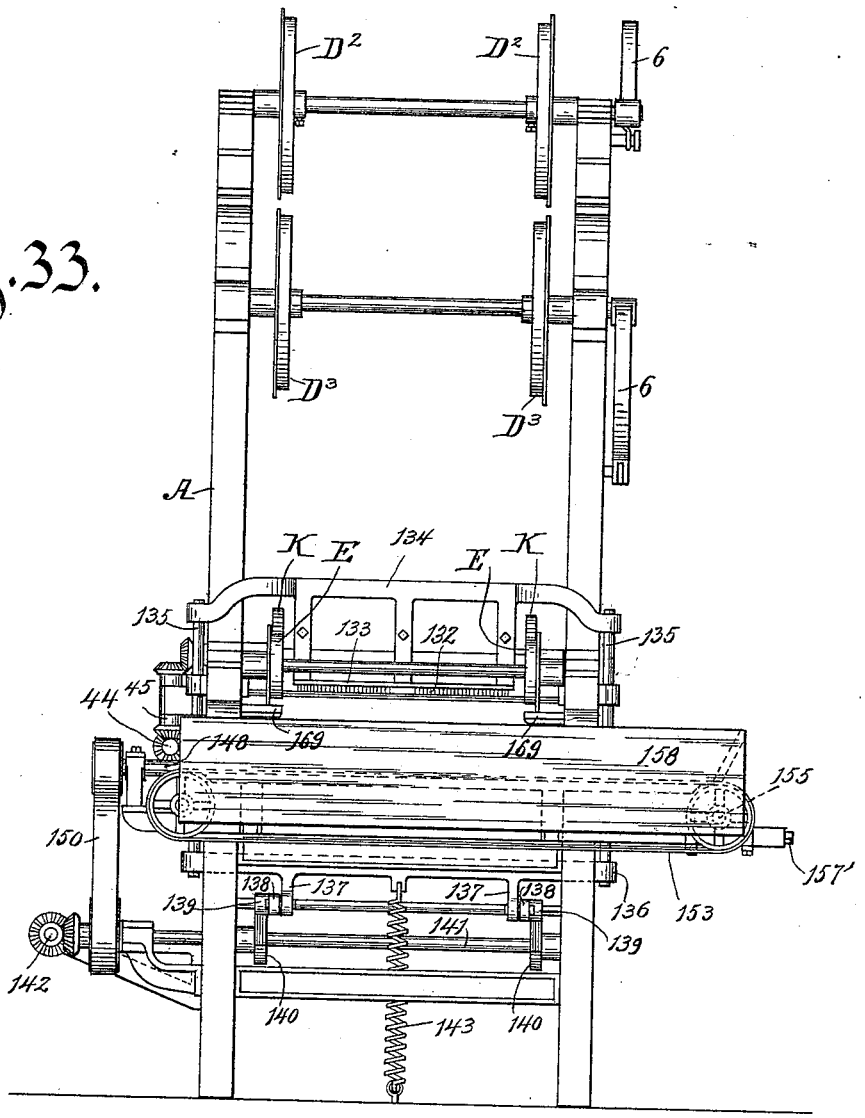

No. 621,886. Patented Mar. 28, 1899.
W. H. WUSSOW.
MATCH MACHINE.
(Application filed May 19, 1898.)

(No Model.) 25 Sheets—Sheet 23.

Fig. 34.

Witnesses.
C. N. Keeney
Anna V. Faust

Inventor.
William H. Wussow
By Benedict & Morsell
Attorneys.

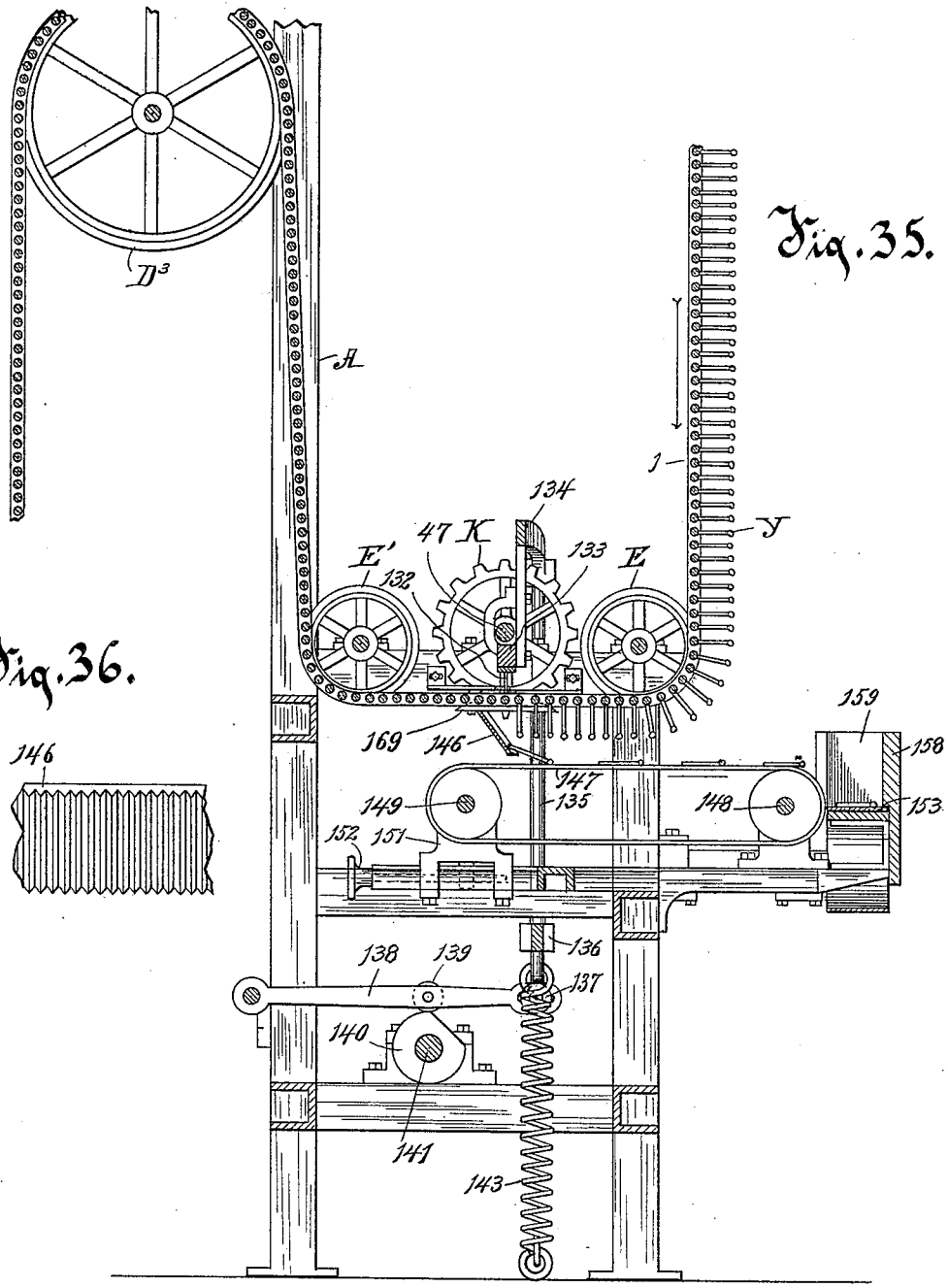

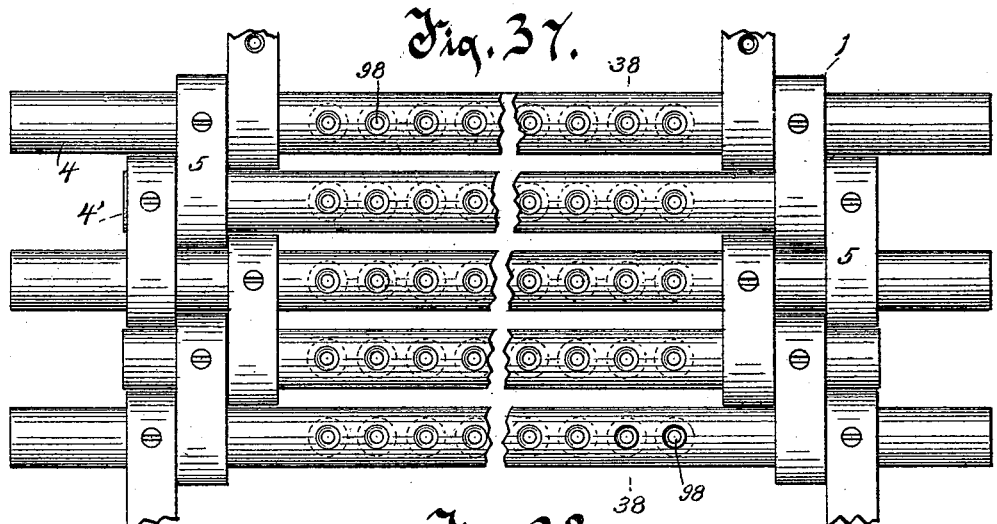
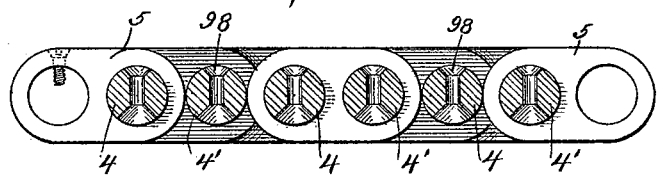
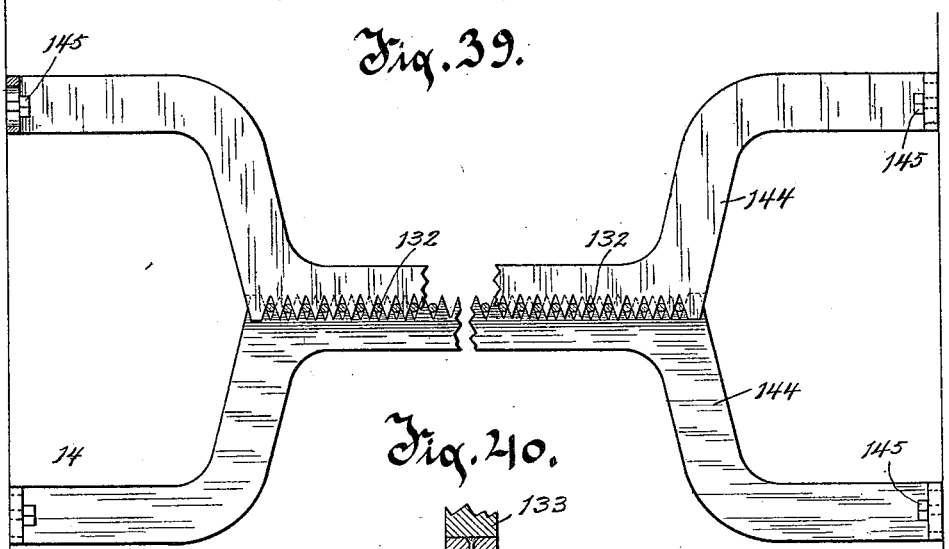
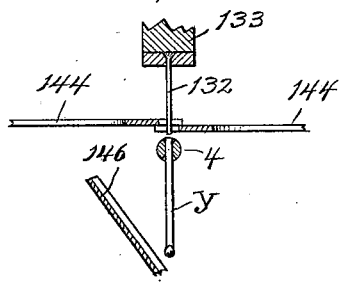

UNITED STATES PATENT OFFICE.

WILLIAM H. WUSSOW, OF OSHKOSH, WISCONSIN, ASSIGNOR OF FIFTY-ONE ONE-HUNDREDTHS TO JOSEPH FLESHIEM AND ROBERT E. JENNINGS, OF MENOMINEE, MICHIGAN.

MATCH-MACHINE.

SPECIFICATION forming part of Letters Patent No. 621,886, dated March 28, 1899.

Application filed May 19, 1898. Serial No. 681,135. (No model.)

*To all whom it may concern:*

Be it known that I, WILLIAM H. WUSSOW, of Oshkosh, in the county of Winnebago and State of Wisconsin, have invented a new and useful Improvement in Match-Machines, of which the following is a description, reference being had to the accompanying drawings, which are a part of this specification.

My invention relates to a machine for the manufacture of friction-matches, the machine being adapted automatically to cut the sticks for matches from blocks of wood fed to it, to suitably coat a portion of the sticks with a freely and persistently burning material, usually paraffin, and to put a cap or head of igniting composition on the several sticks.

The machine includes mechanism for receiving blocks of wood theretofore cut to proper length and carrying them to and holding them up to the cutters, cutters for severing sticks from the blocks and therewith means for inserting the sticks in the bars of an endless carrier, the carrier adapted to receive and hold the sticks, means for supporting and mechanism for moving the carrier, means for heating the sticks, devices for holding and applying the persistently-burning material, mechanism for putting heads of igniting composition on the sticks, mechanism for pushing the matches from the bars of the carrier, and other devices and mechanisms relating incidentally or as auxiliary to these principal features of the machine.

The invention consists of the machine and its several parts and combinations of parts, as herein described and claimed, or the equivalents thereof.

Figure 2:
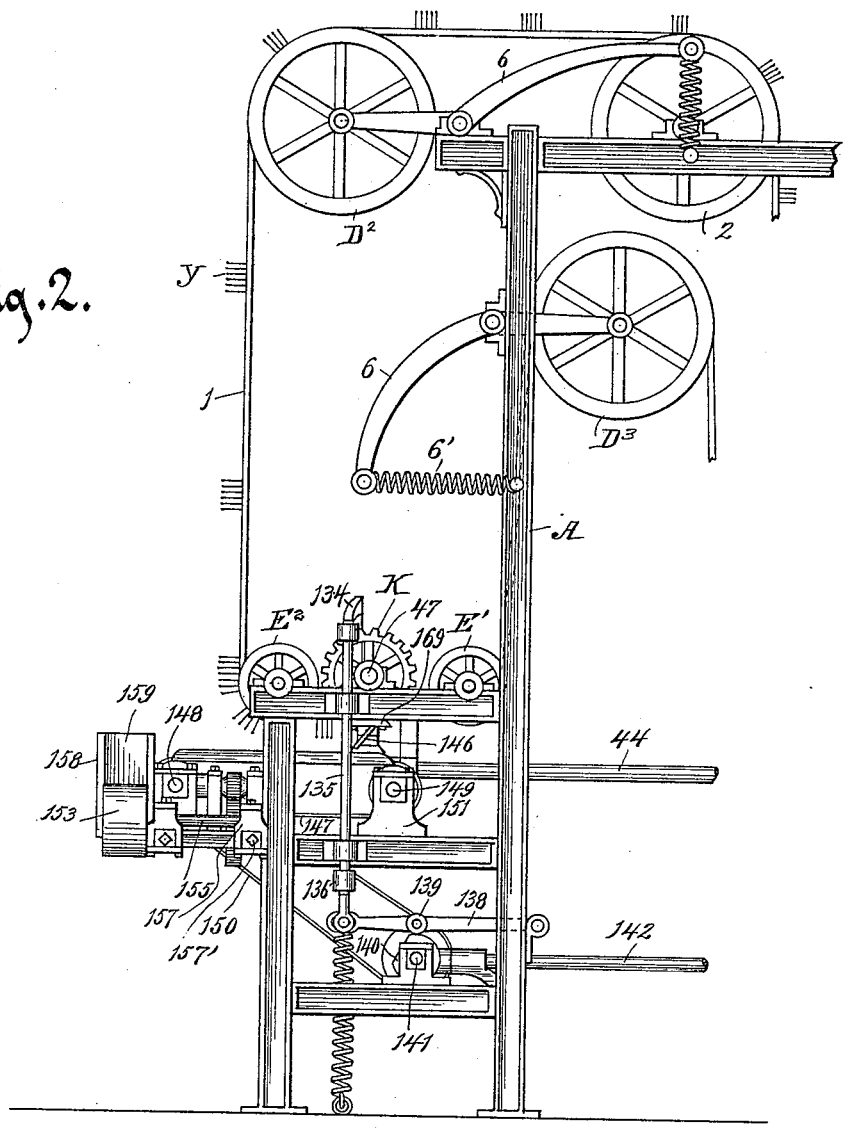
Figure 3:
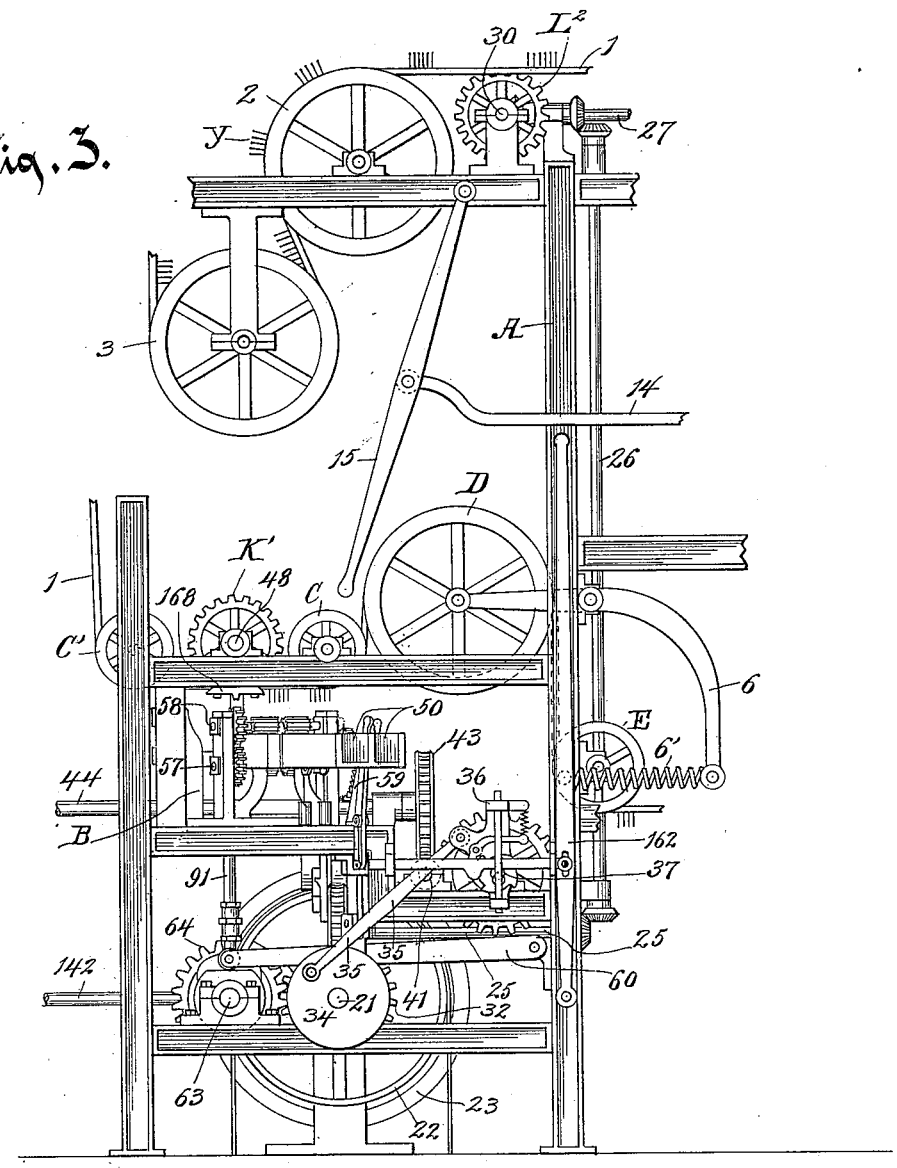
Figure 4:
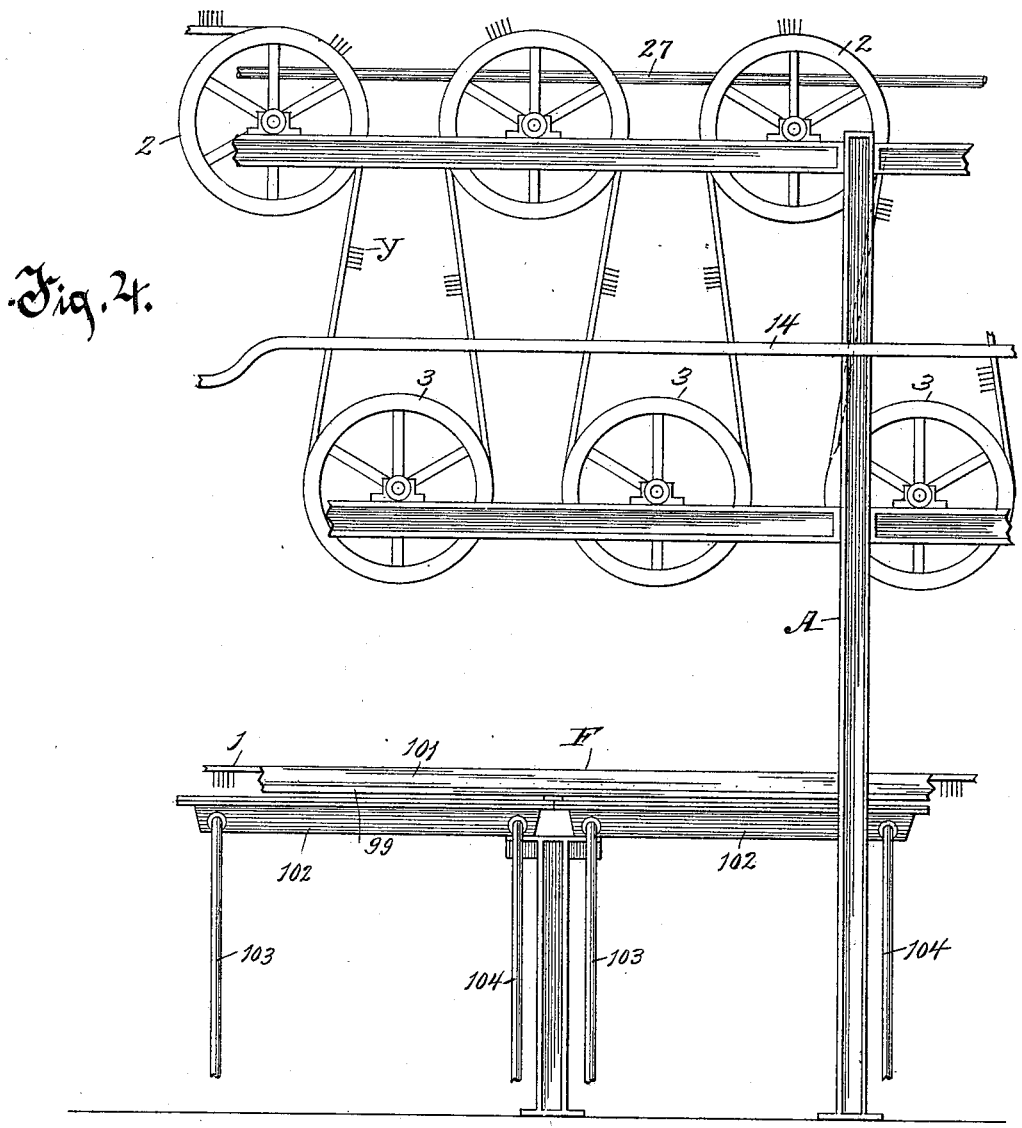
Figure 5:
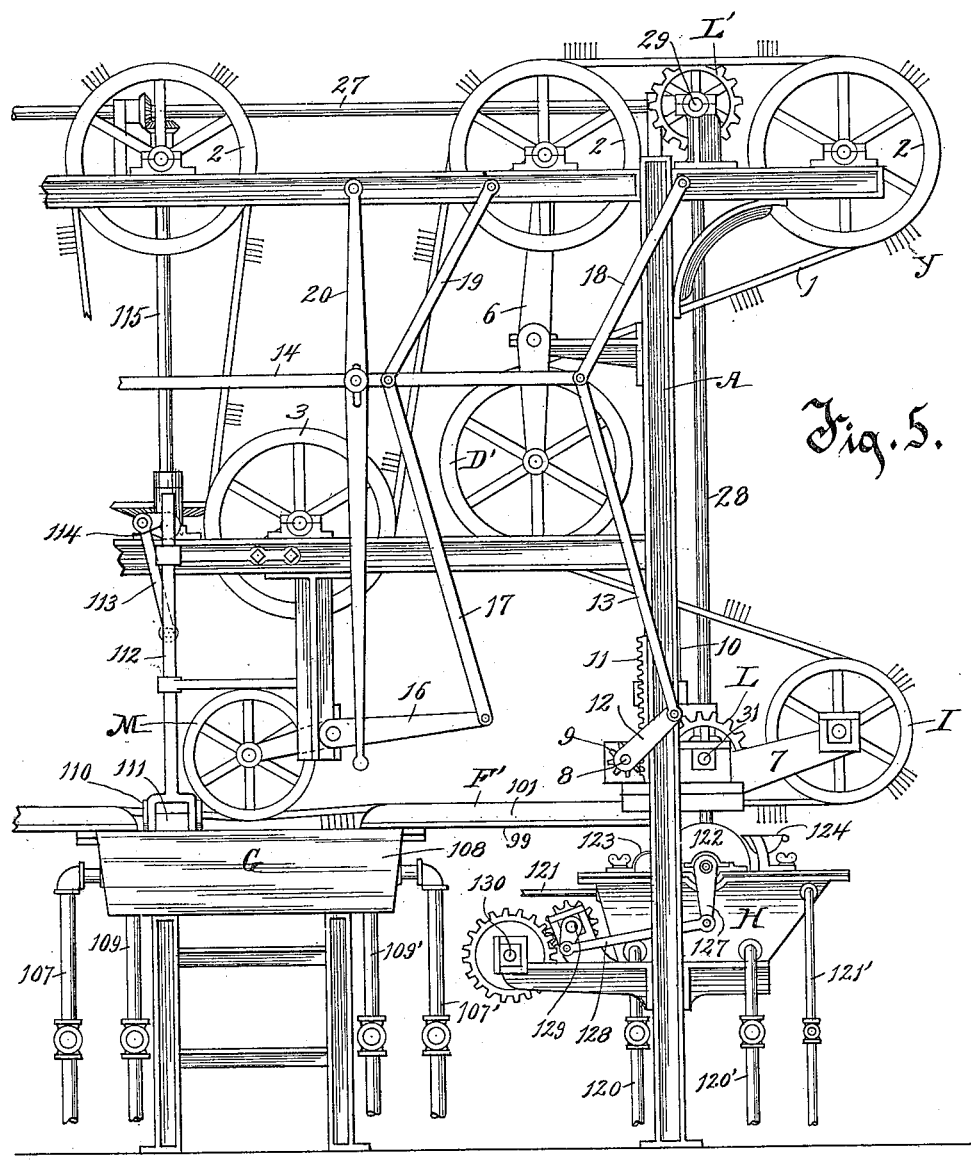
Figure 6:
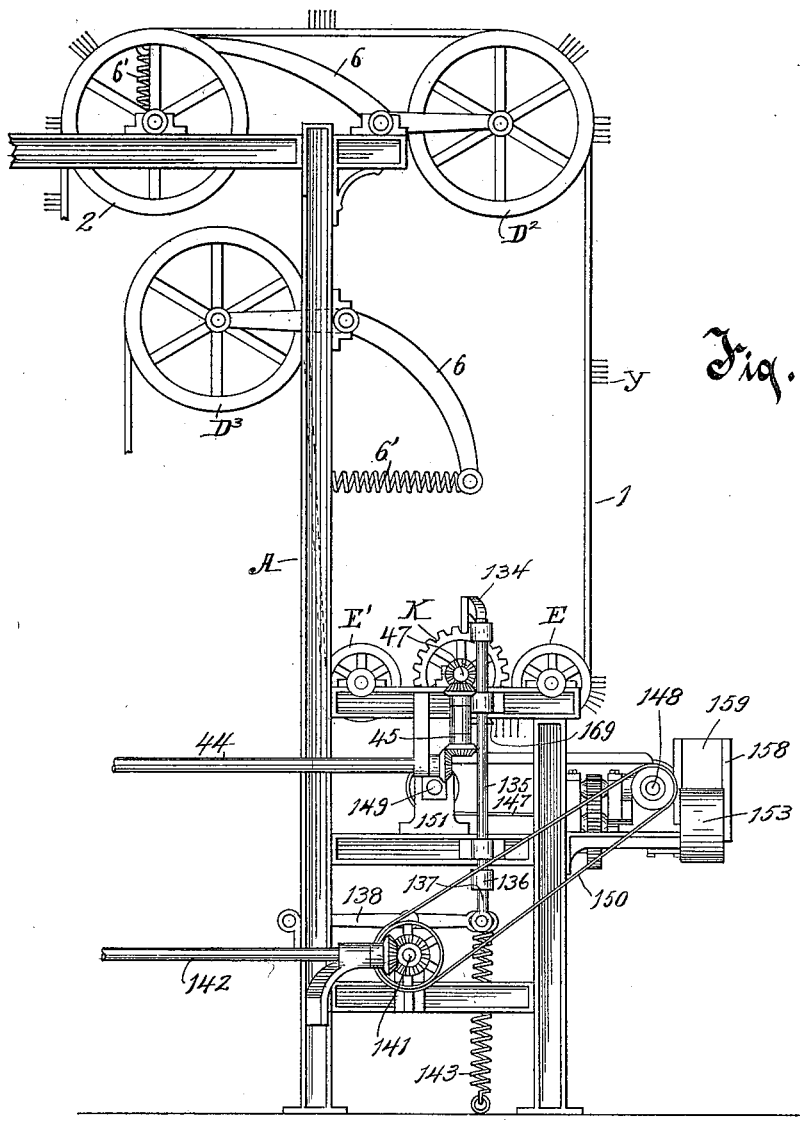
Figure 7:
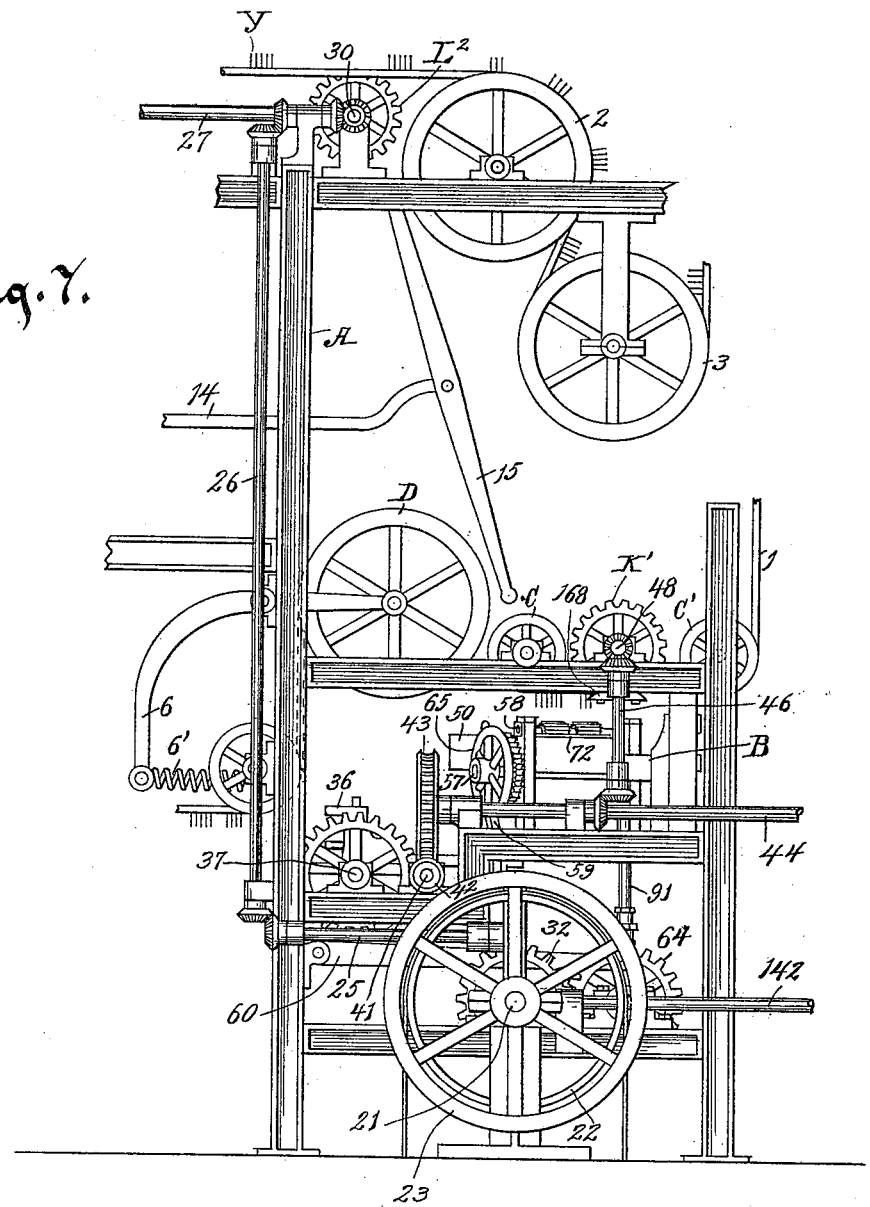
Figure 8:
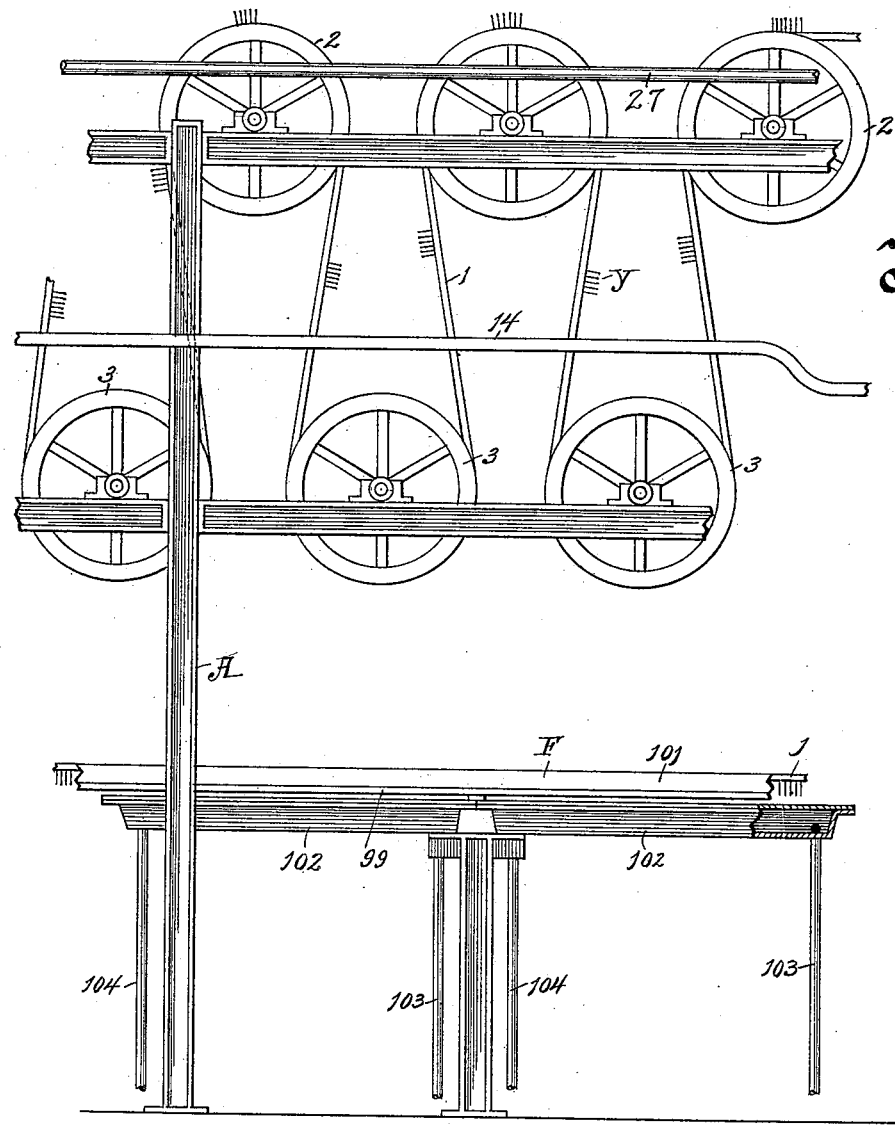
Figure 22:
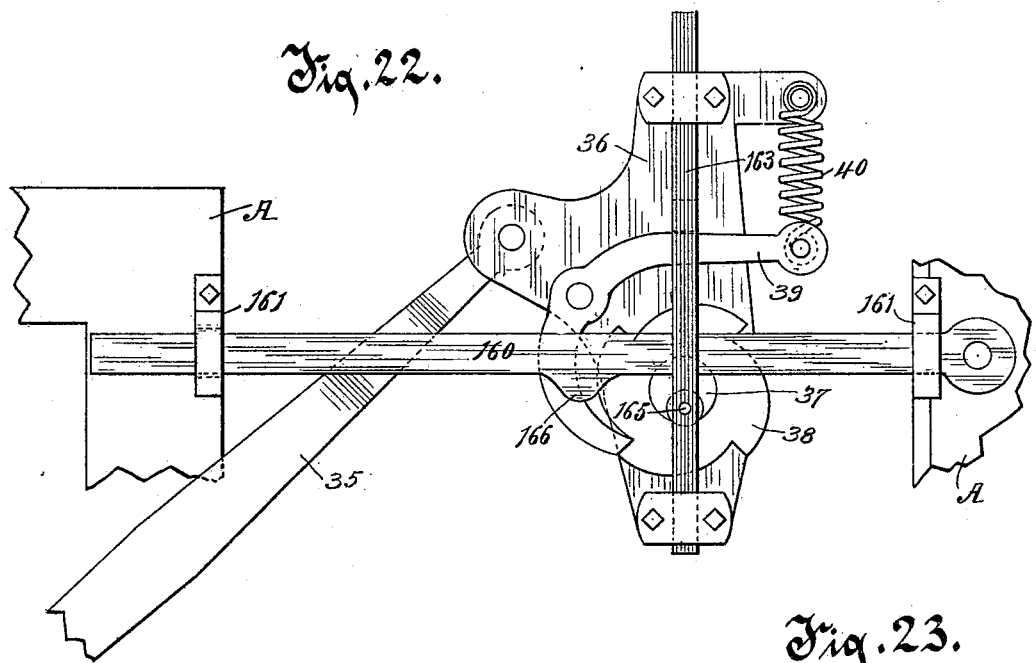
Figures 23, 24:
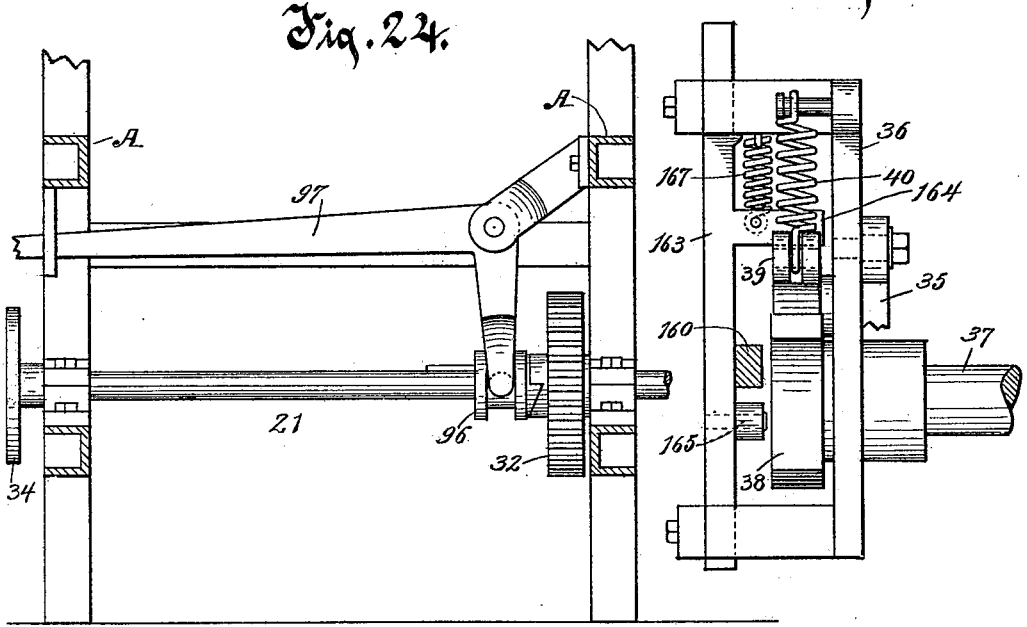
Figure 25:
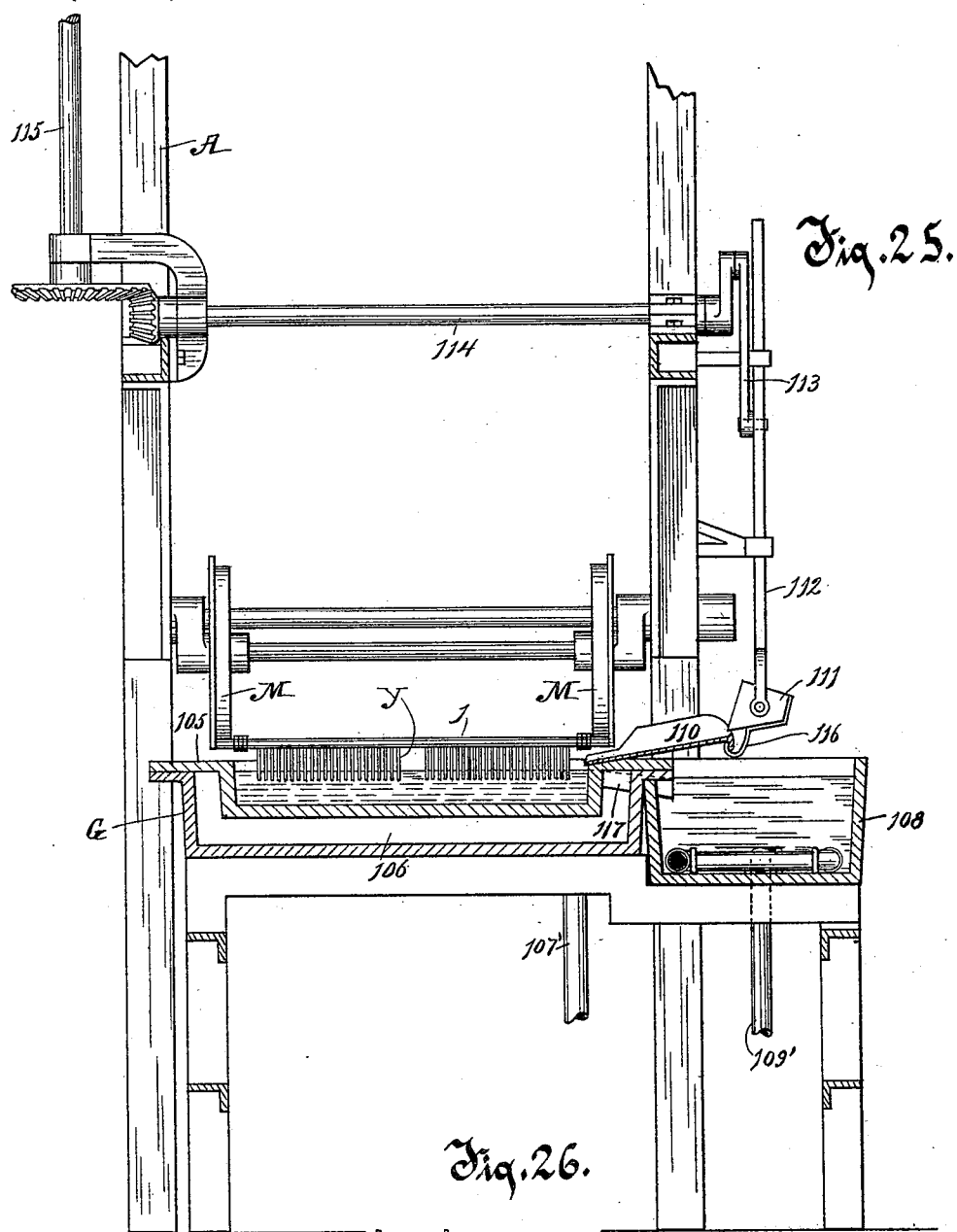
Figure 26:
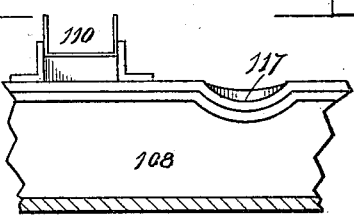
Figure 27:
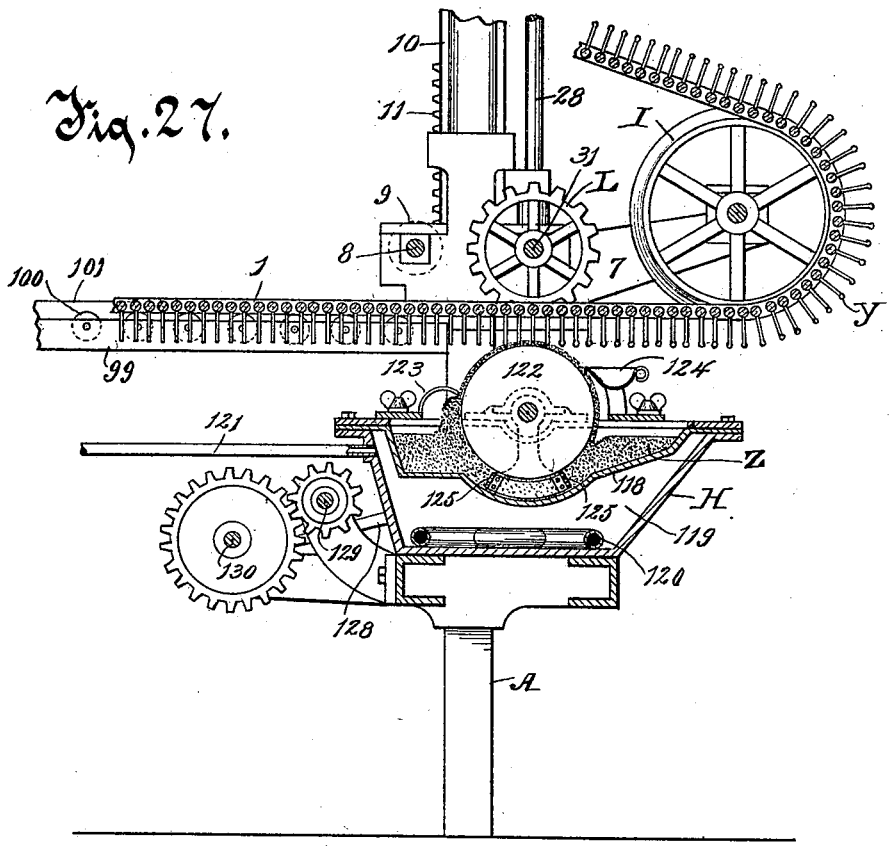
Figure 31:
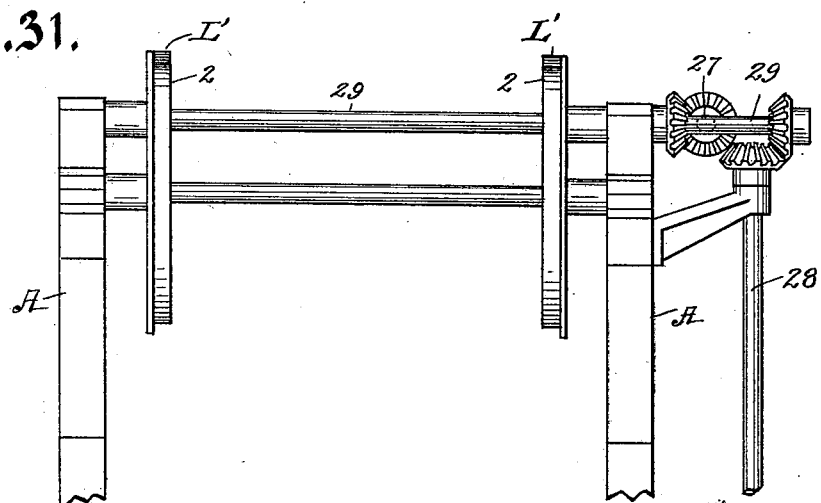
Figure 28:
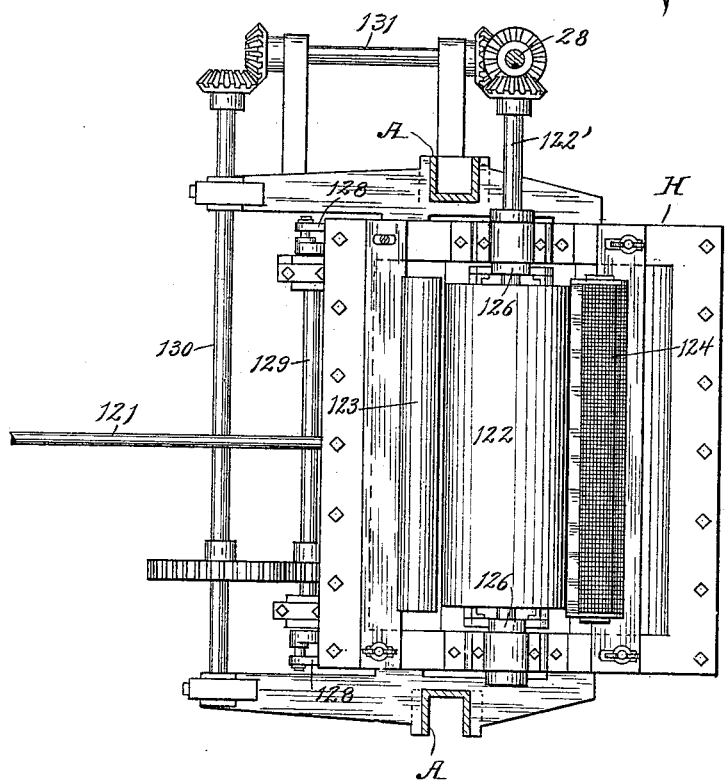
Figure 32:
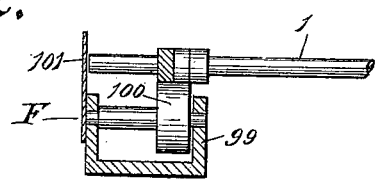
Figure 29:
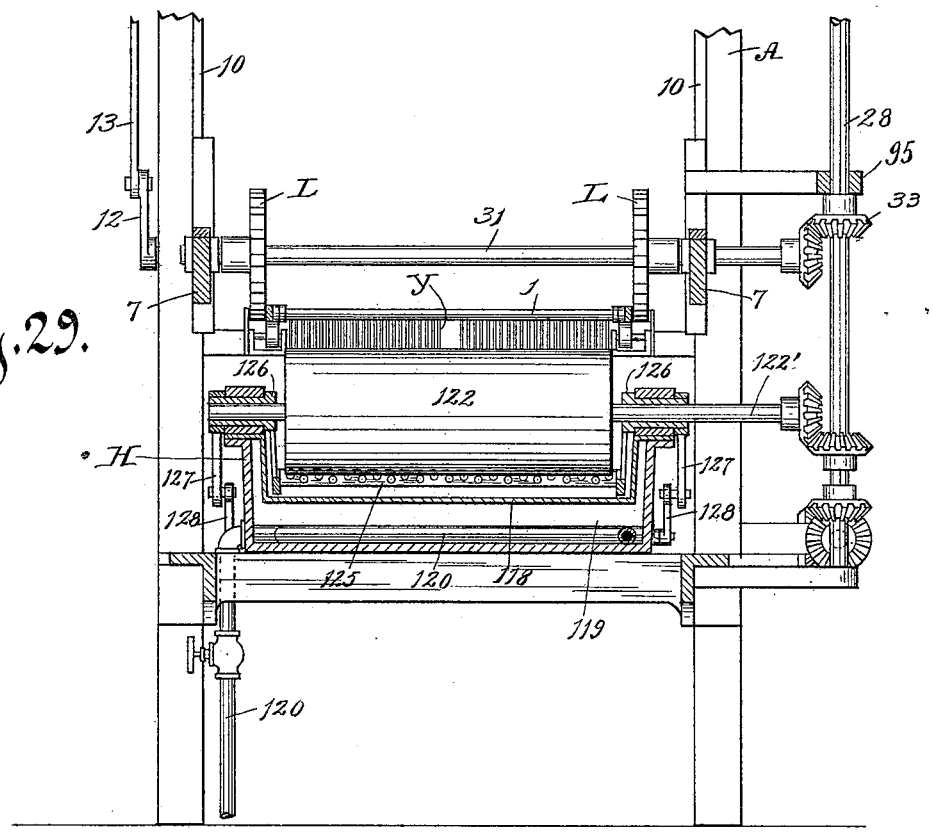
Figure 30:
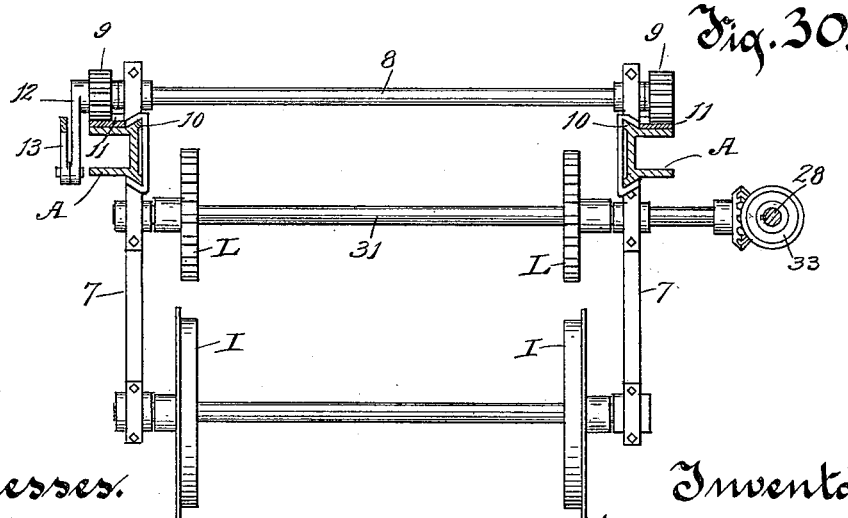

In the drawings, Figure 1 is an elevation, on a small scale, of the principal parts of the machine as seen at the front. Fig. 2 is an elevation of the front of that part of the machine seen at the left in Fig. 1 and includes the mechanism for discharging the matches from the carrier. Fig. 3 is an elevation of the front of that part of the machine just at the right of the part seen in Fig. 2 and includes the stick cutting and sticking mechanism below and a fragment of the carrier above, with some of the means for supporting and moving it. Fig. 4 is a front elevation of a part at the right of that shown in Fig. 3 and includes the stick-heating apparatus below and a fragment of the carrier and its support above. Fig. 5 is a front elevation of that part of the machine at the right in Fig. 1 and includes the devices and mechanism for holding and applying the burning material, the devices and mechanism for holding and putting on the composition heads, a fragment of the carrier with devices for supporting and moving it and mechanism incidental to these features. Fig. 6 is a rear elevation substantially of parts, a front elevation of which is shown in Fig. 2. Fig. 7 is a rear elevation substantially of parts shown in front elevation in Fig. 3. Fig. 8 is a rear elevation substantially of parts shown in front elevation in Fig. 4. Fig. 9 is a rear elevation substantially of the parts shown in front elevation in Fig. 5. Fig. 10 is a top plan view of the principal features of the block-feeding and stick-cutting mechanism. Fig. 11 is a vertical section longitudinally of the stick-cutting mechanism shown in Fig. 10 and of parts adjacent thereto. Fig. 12 is a vertical section transversely of the machine just in front of and looking toward the block-feeding and stick-cutting mechanism. Fig. 13 is a vertical section longitudinally of some parts of the stick cutting and sticking mechanism in comparatively larger size, showing the positions of the parts at the moment of commencing to cut the sticks from the blocks of wood. Fig. 14 is a vertical section longitudinally, showing the same parts seen in Fig. 13, but at the moment of inserting the sticks in a bar of the carrier. Fig. 15 is a plan of the cutters in place on their support and of related mechanism. Fig. 16 is a front elevation of a fragment of the support or framing of the cutters. Fig. 17 is a rear view of a central portion of parts shown in Fig. 15. Fig. 18 is a longitudinal section of the feed-box for wood blocks with the devices for feeding the blocks to the cutters. Fig. 19 is a transverse section of the boxes for blocks with the block-pushers mounted therein. Fig. 20 is an elevation of a fragment of an anvil-bar provided with pins for supporting the match-sticks at the moment of being severed from the wood blocks, the anvil-bar being shown in cross-section in position in Figs. 13 and 14. Fig. 21 is a cutter-bar, parts being broken away to exhibit features of its construction. Fig. 22 is an elevation of mechanism for communicating an intermittent motion to a portion of the carrier, this mechanism being in proximity to the cutters and being shown in position in Figs. 3 and 11. Fig. 23 is an edge view of the mechanism shown in Fig. 22. Fig. 24 is a clutch mechanism on the main driving-shaft shown in position in Fig. 10. Fig. 25 is a vertical section transversely of the lower portion of the machine through the pan for holding and applying the burning material. Fig. 26 is a section of a fragment of a supply-tank shown in Fig. 25. Fig. 27 is a vertical section longitudinally of parts of the machine at and through the pan for holding the igniting composition. Fig. 28 is a plan view of the pan, its support, and related parts shown in Fig. 27. Fig. 29 is a vertical section transversely of the lower portion of the machine through the pan for holding the igniting composition. Fig. 30 is a plan of devices above the composition-pan for carrying and raising and lowering the carrier. Fig. 31 is a detail of carrier supporting and driving mechanism located at the right in Fig. 1. Fig. 32 is a detail of carrier-supporting mechanism on the ways extending much of the distance between the stick-cutters and the composition-pan. Fig. 33 is an elevation of the end of the machine at the left in Fig. 1, the carrier being omitted, showing parts of the match-discharging mechanism. Fig. 34 is a plan of an endless apron and its supporting and driving mechanism, the apron being located below the match-discharging punches and at the left in Fig. 1. Fig. 35 is a vertical section longitudinally of the match-discharging mechanism at the left in Fig. 1, with the endless apron of Fig. 34 in position relative thereto and some related parts. Fig. 36 is a perspective of a fragment of a match-chute shown in position in Fig. 35. Fig. 37 is a plan view of a fragment of the stick and match carrier, broken away centrally for convenience of illustration. Fig. 38 is a section of a fragment of the carrier, the locality of the section being indicated by 38 38 on Fig. 37, looking toward the right. Fig. 39 is a plan view of an adjustable guide for the match-discharging punches shown in position in Fig. 35. Fig. 40 is a section of the guide shown in Fig. 39, showing also adjacent parts in their relations thereto and method of operation.

In the drawings, A is a frame of such suitable size and proportions as adapts it for supporting the operative mechanism.

A principal part of the machine is the endless stick and match carrier 1, which is adapted to receive and hold the sticks when they are cut from the blocks of wood and carry them to and past the several devices and groups of mechanisms for completing the matches, and thereafter for a considerable distance in the air, during which time the composition heads of the matches become dry and hard, and to the discharging mechanism, where the completed matches are discharged from the machine. This endless flexible carrier 1 is so mounted that it is adapted to be and is moved past the discharging mechanism and past the stick-sticking mechanism intermittently, while the remainder of the carrier, which is much the greater part of it in length, is moved continuously and without intermitting while the machine is in operation. The carrier is supported chiefly on a large number of skeleton or open drums or pulleys and on horizontal ways, also provided with antifriction-rolls to receive its bearing. The carrier after passing the stick cutting and sticking mechanism (located at B in Fig. 1) passes under the pulley C and over the yielding pulley D and under the pulley E along on the horizontal ways F, past the heating devices located opposite these ways to the mechanism for applying the burning material at G, thence on the horizontal ways F' to the mechanism at H for applying the composition heads to the splints, thence about the adjustable pulley I, thence about a yielding pulley D', thence over a number of supporting-pulleys mounted on the frame and arranged in two series 2 and 3 in a generally reverse direction to that it traveled below to and about the yielding pulley $D^2$, thence to and about the pulley $E^2$ and past the discharging mechanism and about the pulley E', and thence over the yielding pulley $D^3$ and to and about the pulley C' immediately in front of the stick cutting and sticking mechanism. That section of the carrier that is between the pulleys $D^2$ and D and which passes the match-discharging mechanism and the stick-sticking mechanism is moved intermittently by the toothed wheels K and K', while the remainder of the carrier, which is much the greater part of it, is moved continuously by the toothed wheels L, L', and $L^2$, which several toothed wheels engage the carrier directly and compel its travel in the manner stated.

The flexible stick and match carrier 1 is constructed of transversely-disposed cylindrical bars or rods 4 4', Fig. 37, connected together into a chain or belt by links 5, arranged in series, one series at each end of the short bars, each bar having two links secured to it conveniently by set-screws, which two links are pierced and hold therein the next adjoining bar revolubly, thus forming a jointed or flexible construction. The links are conveniently made of flat blocks of metal suitably bored to receive therethrough the cylindrical rods or bars of the carrier. The extremities of the longer bars 4 project at each side of the carrier beyond the ends of the shorter bars 4', and these projecting ends of the bars 4 form teeth that are engaged by the teeth of the driving-wheels K K', L L', and $L^2$. The pulleys (hereinbefore mentioned) on which the carrier is supported and travels are arranged in pairs on each axle, (the form of which is clearly exhibited by those of the pulleys that are shown in Figs. 31 and 33,) and each pulley includes a rim provided with a tread on which the ends of the bars of the carrier bear, and a radially-projecting flange at the outer side to prevent the movement endwise of the bars of the carrier. These open pulleys are fixed in pairs on an axle, the pulleys being mounted at such distance apart as to properly take thereon the ends of the longer bars of the carrier. The axles of the pulleys D, D', D², and D³ are journaled in the short arms of levers 6, pivoted on the frame, the long arms of which are secured yieldingly to the frame by means of springs 6', Figs. 1, 2, 3, 4, and 9. These pulleys are so disposed that the springs hold the pulleys against the carrier and support it normally in the positions shown in the drawings. The pulleys I are fixed on an axle mounted in laterally-projecting arms 7 7, Figs. 1, 5, 9, 27, and 30, which arms are mounted and slide vertically on ways 10 on two posts of the frame A. A shaft 8, journaled in rear projections of the arms 7 7, is provided with pinions 9 9, that mesh in racks 11 on the frame, whereby by the rotation of the shaft 8 the arms 7 and the pulleys I thereon may be raised and lowered, as desired. A crank-arm 12, fixed on the shaft 8 and connected by a rod 13 to a shifting bar 14, provided with a pivoted hand-lever 15, is adapted for limitedly raising and lowering the pulleys I and the carrier thereon at that end of the machine. The lower extremity of the connecting-rod 13 is slipped removably onto the wrist of the crank 12, so that it can be readily disconnected therefrom, and the crank 12, being rotated entirely around by the attendant, can be made to raise and lower the pulleys I to a greater extent than can be accomplished by the limited rocking of the shaft 8 by means of the shifting bar 14. Pulleys M are by means of their common axle journaled in the arms of rock-shaft 16, pivoted on the frame, a crank-arm of which shaft is connected by a rod 17 to the shifting bar 14. These pulleys M when the machine is at work rest on and depress the carrier 1 at the locality of the pan that holds the burning material. The shifting bar 14 is connected to the frame by swinging arms 18 and 19, respectively opposite the connecting-rods 13 and 17, the united action of the rods 13 and 17 with the swinging arms 18 and 19 being substantially that of toggle-joints, and result in depressing the crank 12 and the crank of shaft 16, respectively, when the shifting bar 14 is pushed endwise toward the rear. An additional hand-lever 20, pivoted at its upper end to the frame, is connected medially to the shifting bar 14, by which the bar 14 can be shifted by the attendant as well as by means of the lever-handle 15.

The operative mechanism of the machine is driven from the main driving-shaft 21, Figs. 1, 3, 7, 9, and 10, which is journaled on the frame, and is provided with a belt-pulley 22 and a fly-wheel 23. The shaft 21 is provided with a worm 24, gearing with a worm-wheel on the shaft 25, which in turn is geared to the upright shaft 26, which at its upper extremity is geared to the horizontal shaft 27, which in turn is geared to the downwardly-extending shaft 28 through the interposed transverse shaft 29, Fig. 31. The shaft 27 at its front end is geared to the transverse shaft 30 and the shaft 28 is geared to the transverse shaft 31. Each of the transverse shafts 29, 30, and 31 is provided with two toothed wheels L L' L², Figs. 29 and 30, which gear with the carrier 1, the teeth of the wheels intermeshing with the projecting ends of the bars 4 of the carrier, Figs. 27, 29, and 37. The gears on shafts 25 26, 27, 28, 29, 30, and 31 and the toothed wheels L L' L² being of homogeneous size and form their action is concurrent and produces a synchronous and continuous travel of the carrier throughout that greater portion of its length that is between the pulleys D and D². The transverse shaft 31 is journaled in the vertically-movable arms 7, Figs. 29 and 30, and the pinion on shaft 31 meshes with a pinion 33, tongued on shaft 28, whereby the pinion on shaft 28 rises and falls with the raising and lowering of shaft 31 and remains in constant mesh with the pinion on that shaft, being held revolubly thereto by shaft-bearing 95, fixed on arm 7.

For moving intermittingly that portion of the carrier 1 that passes the match-discharging mechanism and the stick-sticking mechanism, which portion of the carrier is between the pulleys D² and D, the driving-shaft 21 is provided with a crank-disk 34, Figs. 1, 3, 10, and 11, and a connecting-rod 35, wristed thereto, is pivoted at its other extremity to an oscillating arm 36, Figs. 3, 7, 10, 11, 22, and 23, mounted loosely on a transverse shaft 37, journaled on the frame. A ratchet-wheel 38, fixed on the shaft 37, is engaged releasably by a pawl 39, pivoted on the arm 36, whereby the shaft is compelled to rotate intermittingly by the movement of the oscillating arm 36 in that direction. The pawl 39 is held up to its work by a spring 40, attached thereto and to the arm 36. The transverse shaft 37 is geared to an adjacent transverse shaft 41, Figs. 3, 7, 10, and 11, which shaft 41 is provided with a worm 42, that meshes with a worm-wheel 43, fixed on a horizontal shaft 44, Figs. 6, 7, and 10. The shaft 44 is geared severally to the short upright shafts 45 and 46, which latter shafts are respectively geared to the transverse shafts 47 and 48. The shafts 47 and 48 are each provided with two toothed wheels K K', which toothed wheels mesh with the carrier 1 in the same manner as the wheels L, hereinbefore described, Figs. 6, 7, 11, 13, 14, and 35. The construction and disposition of the mechanism just described are such that the portion of the carrier 1 between the pulleys D² and D, running past the match-discharging and stick-sticking mechanisms, is moved regularly intermittingly, whereby it is properly presented to the said match-discharging and stick-sticking mechanisms with a brief rest to permit of the insertion of sticks and the discharge of matches from the carrier by the mechanisms therefor during its periods of rest, while it is moved forward or fed to those mechanisms in the interval between the moments of rest.

In manufacturing matches with this machine the wood of which the sticks are made is first cut into blocks from a plank, the blocks being of the same length in the direction of the grain of the wood as the lengths of the sticks are to be of which the matches are made. To receive these blocks and properly feed them to the stick-cutters in the machine feed-boxes 50 are provided, Figs. 1, 3, and 10. I preferably employ two boxes or troughs for the wood blocks, and these are located alongside of each other in a horizontal position and at an oblique angle to the line of motion of the carrier and to the stick-cutters, just in front of which they are located and to which they are adapted to deliver the blocks to be cut up into sticks. These boxes are respectively of such size as to receive loosely therein the wood blocks and to permit them to slide forward toward the cutters. In the initial portion of each block a movable pusher 51 is provided, Figs. 10, 18, and 19, which pusher is in the form of an upright block that extends downwardly through a longitudinal slot in the bottom of the box and is provided with laterally-projecting rollers 52 52', respectively, bearing against the inside and outside of the bottom of the box, the pusher-block being also provided with a knob-handle 53. The pusher is actuated by a weight 54, which is connected thereto by a cord 55, that runs over a pulley 56, mounted in a bracket secured to the box at the front end of the longitudinal slot in the bottom thereof. The blocks of material being placed in the boxes in front of the pushers 51 are by the weights 54 carried forward in the boxes to sets of feed-rolls located in the boxes on shafts 57 58, respectively below and above the paths of the wood blocks. The shaft 57 is rotated intermittingly by a pawl 59, Figs. 11 and 12, that takes into a ratchet-wheel fixed on the shaft 57. The pawl 59 is pivoted medially on a lever 60, one extremity of which is pivoted to the frame and the other extremity of which is provided with an antifriction-roller 61, that rides on the periphery of a cam-wheel 62, fixed on a shaft 63, that is provided with a cog-wheel 64, meshing with and driven by a cog-wheel 32 on the driving-shaft 21, Figs. 3 and 7. The feed-roll shaft 57 at the end distant from the end having the ratchet-wheel thereon is geared to the feed-roll shaft 58. The construction and disposition of the parts are such as to move the feed-rolls synchronously intermittingly in harmony and alternating with the movement of the cutter-bars upwardly, as hereinafter described. The shaft 57 is provided with a hand-wheel 65, by which it can be rotated independently of the pawl 59, if desired. The pawl 59 is held yieldingly up to its work by a spring 66, attached thereto and to the frame, Fig. 12. A bar 67, sliding horizontally in the frame, is provided with a stud having an antifriction-wheel 68 thereon, that bears against the pawl 59, and the other extremity of the sliding bar is provided with a lever-handle 69, pivoted medially on the frame, adapted to throw the pawl 59 out of engagement with the ratchet-wheel on shaft 57. The handle 69 is slightly elastic and is adapted to engage a shoulder on a fixed bar 70, and thereby be held in position when the pawl 59 is thrown out of engagement with the ratchet-wheel, Figs. 10 and 12. Springs 71, secured to the sides of the boxes 50, are adapted to crowd the blocks against the opposite or long sides of the respective boxes as they come to the feed-rolls. A cover 72 over the inner ends of the feed-boxes holds the blocks in place in the boxes as they approach the cutters.

Match-sticks are cut from the wood blocks by means of a sufficient number of knives or cutters that are so arranged as to cut and remove a series of sticks from the entire front edge of each block of material as it is presented diagonally to the cutters, Figs. 10 and 15. The match-sticks are preferably cut in cylindrical form, and for this purpose each knife or cutter is formed about a circular aperture in the end of a cutter-bar 73, Figs. 15 and 21, the aperture 74 through the cutter-bar being advisably slightly oblique, inclining away upwardly from the end of the bar, so that as the stick is severed from the block and passes upwardly through the cutter-bar it will be tilted slightly away from the wood block and firmly against the face of a plate hereinafter described. These several cutter-bars are detachably secured to a vertically-reciprocable cutter-bar frame 75, the lateral ends of which are extended vertically and travel in ways therefor on the main frame, Figs. 10, 12, and 15. A bed-plate 76, secured to the frame 75, is provided with suitable front and rearwardly extending grooves 77, in which the several cutter-bars 73 are inserted, fitting snugly but removably therein, and removable pins 78 are inserted through medial apertures therefor in the cutter-bars and in the bed-plate 76. A holding-plate 79, Figs. 13, 14, 15, and 17, secured detachably to the frame 75 and being normally a part thereof, rests on the bed-plate 76 and extends over a front medial portion of the cutter-bars and holds them in position in the grooves 77 in the bed-plate otherwise than by the longitudinal withdrawal thereof on removing the pins 78. A locking-plate 80, hinged to the holding-plate 79, rests releasably on the tops of the pins 78 and holds them in their seats. A handle-latch 81, secured to the locking-plate 80, is arranged to engage releasably a spring-catch 82, secured to the frame 75, and thereby to hold the locking-plate 80 releasably in place. A trimming-knife 83, consisting of a bar having a sharp downwardly-presented front edge and secured to the front transverse edge of the frame 75, is adapted to trim the material wood blocks by cutting therefrom the sharp projecting ribs that remain on the front of the block after each act of cutting a series of sticks therefrom. In the cutting act this trimming-knife precedes the cutters and removes the sharp ribs from the blocks in advance of the sticks being cut therefrom. A passage at the rear of the trimming-knife provides for the escape of the severed ribs or splints of waste material. A stick-supporting plate 84, Figs. 13, 14, 15, and 16, rests on the frame 75 in front of the bed-plate 76 and at a little distance therefrom, Figs. 13 and 15, and immediately beneath the front portion of the cutter-bars 73 and is adapted to be thrust forward underneath the cutters and underneath the match-sticks after they have been completely cut from the wood blocks and to support the match-sticks and force them into the carrier as they are carried upwardly with the frame 75, as hereinafter described, Fig. 14. The plate 84 is provided at its extremities with rearwardly-extending arms 84', having stud-pins 85, preferably provided with roller-bearings that enter and travel in upwardly and downwardly extending ways 86 therefor on the frame, the ways being so constructed as to move the supporting-plate 84 forwardly beneath the match-sticks during the upward movement of the frame 75 just as the plate 84 comes to and passes above the plane of the top of the wood blocks X in the feed-boxes 50 and to retrieve the plate 84 from beneath the cutters, Fig. 13, at the moment the plate 84 in the downward movement of the frame 75 approaches the horizontal plane of the top of the blocks X. A face-plate 87 at the front of and secured to the holding-plate 79 is provided with vertically-extending channels 88, Figs. 15 and 16, adapted to receive therein the sticks as they are cut from the wood blocks and guide and support them, in connection with the cutter-bars, in vertical positions and so disposed as to register with and be insertible in apertures therefor in a bar of the carrier 1 in a manner hereinafter described. A bed-bar 89, secured to the boxes 50 just below the planes of the bottoms of the boxes at their front diagonal ends, is provided with a series of short pins 90, Figs. 13, 14, and 20, projecting upwardly therefrom and so disposed as to register with the apertures 74 of the cutter-bars 73 and adapted to slightly enter those apertures as the cutters come down thereto, thus permitting such sufficient downward movement of the cutters as to completely sever the sticks Y from the wood blocks. For reciprocating the cutter-frame and the cutters thereon vertically the frame 75 is connected to eccentric wrists or cranks of the doubly wristed or cranked shaft 63 by means of pitmen 91, Figs. 11, 12, 13, and 14. These pitmen 91 are constructed in two parts united together by reversely-screw-threaded nuts 92, whereby the length of the pitmen can be adjusted and the vertical throw of the cutters can be regulated. The cranks 93 on the shaft 63, to which the pitmen 91 are connected, are extended on the reverse or opposite side of the shaft 63 and are enlarged to form by their aggregate weight a counterbalance 94 on the shaft 63 to the load carried by the pitmen 91.

It is sometimes desirable to stop the work of the stick-cutting mechanism during the continued operation of the remainder of the machine, and this non-action of the stick-cutting mechanism is especially desirable when about to stop work with the machine, as it is then important to continue the operation of the remainder of the machine until all the sticks that have been inserted in the carrier shall have been taken through the machine and converted into complete matches and discharged therefrom, so that the machine will be emptied of all sticks and matches, when it is completely stopped. For the purpose of disconnecting and stopping the stick-cutting mechanism the cog-wheel 32 is revolubly loose on the driving-shaft 21 and is secured revolubly thereto by the clutch 96, Fig. 24, splined on shaft 21. The clutch-collar 96 is thrown into and out of engagement with the hub of the wheel 32 by means of a bell-crank lever 97, pivoted at its angle on the frame and provided with furcate fingers that ride in an annular groove therefor in the clutch-collar 96. Above the cutters and directly over the carrier there is a drum 49, fixed on the shaft 48, which drum is so constructed and disposed as to bear against the upper surface of the carrier, and particularly against the bar of the carrier into which the sticks are being stuck by the upward movement of the cutter-frame, Figs. 11, 12, 13, and 14. The carrier-bars 4 4' are each provided with series of vertically-disposed apertures 98 98, so disposed as when brought over the cutters to register therewith, and these apertures are preferably reamed out, forming funnel-like entrances to the apertures both below and above, so that the match-sticks entering from below or the punches entering from above to discharge the matches will readily find entrance to these apertures, Figs. 37 and 38. The apertures 98 are of such diameter as to admit snugly therein the match-sticks cut by the cutters, and when the sticks have been inserted in these bars 4 4' by the means hereinbefore described they will by reason of the tightness of their fit in the bars be held therein against removal therefrom by the retreating downwardly of the cutter-bars when the cutter-frame goes down. The grip of the cutter-bars 4 4' on the match-sticks and matches by reason of the snugness of the fit of the match-sticks in the carrier-bar apertures holds the sticks and matches, except in exceptional or accidental instances, in the carrier until they have been carried to the place of discharge from the carrier and are pushed therefrom by means hereinafter described.

When the machine is in operation, the carrier 1, directly after it has been loaded with match-sticks where it passes the stick-cutting mechanism, runs over the wheels D, and thence under the wheels E, and then along on the ways F for a considerable distance, and thence past the burning-material mechanism at G, and thence on another section of ways F' to the composition-applying mechanism H. The ways F are advisably constructed of bars of channel-iron or steel 99, Figs. 4, 8, and 32, supported on the frame, and are provided with antifriction bearing-wheels 100, on which the links 5 of the carrier rest and travel. Guards 101, secured to the outer sides of the channel-irons 99, prevent the shifting of the carrier laterally. For thoroughly drying and warming the match-sticks some steam-tight warming-reservoirs 102 102, supported on the frame, are located immediately below the carrier for some distance in its line of travel directly after it has been loaded with match-sticks. These warming-pans are kept hot by means of steam or hot water introduced thereto through the pipes 103, which steam or hot water is discharged from the warm reservoirs by the discharge-pipes 104.

In the manufacture of matches, and to so prepare them for use that after the composition head of the match has been ignited it will continue to burn and set the wood on fire, that portion of the stick at and adjacent to the end that is to receive the composition head is first coated and to some extent saturated with a freely and persistently burning material. The material most commonly used for this purpose is paraffin. To apply such material to the match-sticks, a paraffin-pan 105 is located below the path of the carrier and at such position with reference thereto that the sticks being carried by the carrier may by the depression of the carrier to a limited extent be dipped in part into and carried through a supply of melted paraffin in the pan, Fig. 25. To keep the paraffin in the pan in a melted and liquid condition, the paraffin-pan 105 is suspended in a hot-water or bath pan 106, which when the machine is in operation is constantly supplied with hot water by a pipe 107, leading thereto, the water being discharged through the pipe 107', Figs. 5, 9, and 25. To keep the paraffin-pan properly supplied with liquid paraffin, a supply-tank 108 is provided, in which paraffin is melted and kept hot by means of steam carried through the pipe 109, which enters and extends in an irregular course through the tank near its bottom and leads therefrom by the exhaust-pipe 109'. A trough 110, having its initial end over the supply-tank 108, is disposed in an inclined position, with its lower end so arranged as to discharge into the pan 105. A bucket 111 is suspended pivotally and so as by gravity to normally assume an upright position in the furcate arms of a rod 112, movable vertically in brackets fixed on the frame. The rod 112 is pivoted to a connecting-rod 113, which rod at its other extremity is pivoted on the wrist of a crank on a transverse shaft 114, said transverse shaft being geared to an upright shaft 115, which in turn is geared to the shaft 27. The bucket 111 is provided with a hook 116, so disposed as to be adapted when the bucket is lifted by the upward movement of the rod 112 to engage a catch therefor on the under side of the initial end of the trough 110 and cause the bucket by the upward movement thereof to be overturned and to discharge its contents into the trough 110. The construction and disposition of the parts are such that the bucket 111 when the machine is in operation is intermittingly lowered into the supply-tank 108 and is raised therefrom and discharges its contents through the trough 110 into the pan 105, thereby keeping up the necessary supply of liquid paraffin in the pan 110, any surplus of paraffin in the pan being discharged by the overflow-spout 117 back into the tank 108. The pulleys M M are so mounted in the levers 16 that when the machine is in operation these pulleys by means of the shifting bar 14 are forced against the upper side of the carrier 1 to such extent as to deflect it downwardly somewhat, causing it to travel so near the top of the pan 105 that match-sticks in the carrier will be dipped partly into and thus carried through the paraffin in the pan, whereby their ends are coated and to some extent saturated with the liquid paraffin. After leaving the mechanism at G the carrier runs forward on the ways F' to the mechanism for applying composition heads to the sticks at H. For applying heads or caps of ignitible composition to the ends of the sticks a composition-pan 118 is supported on the frame directly below the path of the carrier 1. The pan is supplied with a quantity of semiliquid or viscous ignitible material or composition Z, and this material is kept in its semiliquid condition by suspending the composition-pan 118 in a hot-water or bath pan 119, the water in which is kept hot by means of steam introduced thereto through a pipe 120, which is bent and extended in diverse directions at the bottom of the pan and leads therefrom in a suitable discharge-pipe 120', Figs. 1, 5, 9, 27, 28, and 29. Water is supplied to the pan 119 conveniently through the pipe 121, and the overflow is discharged therefrom through the pipe 121'. A roller 122, located partially in and partially above the pan 118, is by means of its axle 122' geared to the shaft 28 and is rotated thereby when the machine is in operation. The composition Z in the pan adheres to the roller 122 and is carried up and over it by the rotation of the roller, and the roller is so disposed with reference to the path of the carrier 1 that the ends of the match-sticks enter the composition on the top of the roller as they pass it in the manner indicated in Fig. 27, and thereby the match-sticks are capped or provided with heads of the ignitible composition, that adheres to the sticks. The roller 122 at its upper side rotates in the direction of the travel of the carrier past it. A scraper 123, secured adjustably to the pan 118, is adapted to prevent an undue amount of composition from adhering to and being carried upwardly over the roller 122, the excess of composition being scraped or turned back into the composition-pan. A refuse-catcher 124, consisting of a trough substantially as long as the length of the roller 122 and as the width of the carrier 1, is located just at the rear of the roller 122 and below the carrier 1 and is adjustably mounted on the pan 118. The refuse-catcher 124 is provided with a screen bottom and is adapted chiefly to catch any sticks that may be accidentally pulled out of the carrier at this locality by the tenacity of the composition or otherwise. Sticks are not likely to be pulled from the carrier by the composition, except only in instances where for some cause the stick is of incomplete size and is inserted too loosely in the carrier. The adjustments of the scraper 123 and of the refuse-catcher 124 are toward and from the roller, as clearly indicated in Figs. 27 and 28. To prevent the heavier portions of the composition Z from settling at the bottom and to keep it thoroughly and equally mixed, a composition-stirrer is provided, consisting, advisably, of two longitudinal perforated bars or paddles 125, suspended near the bottom of the pan at a little distance from each other in depending radial arms fixed in the hubs 126, journaled and revoluble limitedly in boxes therefor on the rim of the pan 118. The roller-axle 122' is journaled in these hubs 126, which are concentric therewith. The hubs 126 are provided with crank-arms 127, that are pivoted to connecting-rods 128, that at their other extremities are pivoted to crank-arms on shaft 129, which is geared to shaft 130, which latter shaft is in turn geared to shaft 28 through the intermediate shaft 131. The construction and arrangement of parts just described are such as to cause the stirrers 125 to oscillate in the composition while the machine is in operation, and thus maintain the proper consistency of the composition. When the matches have thus been completed by putting composition heads thereon, they are carried by the carrier 1 a considerable distance through such devious path, as has hereinbefore been described, upwardly and from the right extremity of the machine to the extreme left extremity thereof and down to the discharging mechanism at the lower left portion of the machine, as seen in Fig. 1, which discharging mechanism is shown in greater detail in Figs. 2, 6, 33, 35, 36, 39, and 40. While being thus carried for the considerable distance stated, the composition heads on the matches set and become hard, so that the matches may thereafter be handled without danger of the composition coming off or adhering to any article with which the matches may come in contact. For removing the matches from the carrier a series of punches 132, Figs. 33, 35, 39, and 40, are fixed in a punch-bar 133, the punches being located above and so disposed as to register with the apertures in a bar of the carrier when that bar comes beneath them. The bar 133 is secured to depending legs of a yoke 134, secured to the upper extremities of downwardly-extending rods 135 135, the lower extremities of which rods are secured to a transverse rail 136. The rods 135 are mounted and slide vertically in brackets or ways therefor on the main frame. The yoke 134, the rods 135, and the rail 136 form a punch-carrying vertically-reciprocable frame. The rail 136 is provided with ears 137, that are pivoted in the free extremity of swinging arms 138, pivoted at their other extremities on the frame. These arms 138 are provided medially with bearing-rollers 139, resting on cam-wheels 140 on the transverse shaft 141, which shaft is geared to the longitudinally-extending shaft 142, which at its other extremity is geared to the driving-shaft 21, Figs. 1, 2, 6, 10, 33, and 35. A spring 143, connected to the rail 136 and to the floor, is adapted to draw the punch-carrying frame downward quickly and with an initially strong action, forcing the punches into the apertures in the carrier-bar, when the bearing-rollers 139, traveling on the cam-wheel 140, come to and follow the straight bearing-surface on the cam, the punches being lifted from the carrier during the time of the travel of the bearing-rollers 139 on the curved portion of the cam-wheel 140. This construction is adapted to secure a quick and initially strong action of the punches regularly as the several bars of the carrier are intermittently brought thereto, while at the same time the elasticity of the spring provides for the accident of the failure of the punches on the downward movement of the punch-carrying frame to enter the apertures in the carrier-bar, and thus obviates the breaking of the machine or punches on such accidental failure of the punches to properly enter the apertures in the carrier-bar. For properly supporting and directing the punches into the apertures in a bar of the carrier a punch-guide 144 is provided, consisting of two plates or members secured to the frame at their lateral extremities by bolts 145, that pass through laterally-elongated slots in the overturned ends of these plates and turn into the frame. These plates come together substantially in the plane of the punches and are each provided with a toothed edge, the teeth being of considerable length, and the teeth of one plate overlapping the teeth of the other plate, providing interdental spaces, through which the punches 132 pass, whereby they are guided. By means of this construction any slight wear of the parts can be readily taken up and the movements of the punches can be nicely adjusted and accurately guided. An inclined grooved chute 146 is secured to the frame directly below the place of discharge of the matches from the carrier and is adapted to cause the matches as they fall thereon to assume such position that they will be discharged therefrom onto the endless apron 147 in longitudinal positions, with the heads in advance. The endless apron 147, Figs. 33, 34, and 35, is mounted on wheels on shafts 148 and 149, which are journaled in boxes therefor on the frame. The shaft 148 is driven by a belt 150, running thereon from the shaft 141. The shaft 149 is journaled in boxes 151, slidable on the frame, and are made adjustable by means of the tightening-screws 152, turning through parts of the frame into lugs on the boxes. By this means the tension of the apron 147 may be properly regulated. The matches as they are discharged from the carrier and slide down the chute 146 are delivered intermittingly in series as they are discharged from the carrier on the apron 147 and are so delivered thereto that they lie thereon longitudinally thereof, with their heads in the direction of the movement of the apron, Fig. 35. At the outer extremity of the travel of this apron the matches are discharged therefrom onto an endless apron 153, which apron is only slightly wider than the length of the matches. This apron 153 runs on wheels on shafts 154 and 155, mounted in boxes therefor on the frame. The shaft 154 is geared to a short shaft 156, which in turn is geared to the driven shaft 148, Fig. 34. The shaft 155 is journaled in boxes 157, adjustable on the frame by means of screws 158, turning through a portion of the frame and into parts of the boxes. By this construction the tension of the apron 153 is regulated. The upper line of the apron 153 runs in a trough or box 158, the side walls of which trough are close to and project for a considerable distance above the apron 153, forming guards that prevent the escape of matches from the apron laterally in either direction. The upper line of the apron bears movably on the bottom of the trough, which forms a support for the apron and its load. At the rear end of the trough an end board 159, preferably in an inclined position, serves the purpose of a dam or stop against which the matches are bunched as they are brought thereto by the continuously-moving apron for convenient removal therefrom in proper arrangement for boxing.

In connection with the oscillating arm 36 and the thereby intermittingly-moved shaft 37 I have provided a device, Figs. 1, 3, 10, 22, and 23, for detaching the oscillating arm 36 from the shaft 37 operatively with reference to permitting the intermitting shaft 37 and the mechanism driven therefrom to remain at rest while other parts of the machine are in operation. As this releasing device will rarely, if ever, be required, I have not deemed it important to describe it in connection with the specific description of the oscillating arm 36, the shaft 37, and the means for connecting them operatively. The releasing device consists of a bar 160, mounted and slidable endwise in brackets 161 therefor on the frame, which bar at one extremity is connected to a hand-lever 162, pivoted at its lower extremity on the frame. A rod 163, slidable vertically in ways therefor on the oscillating arm 36 substantially at right angles to the bar 160, is provided with a finger 164, projecting laterally therefrom just above the upper arm of the pawl 39, Fig. 23. It is also provided with a stud-pin 165, having thereon an antifriction-roller, located a little below the bar 160. The bar 160 is provided with a downwardly-projecting process or cam 166, so disposed that when the bar 160 is shifted toward the right, Figs. 3 and 22, the cam will be brought into contact with the stud-bearing 165, whereby the rod 160 will be forced down, carrying the pawl 39 with it, taking the pawl out of the path of the teeth of the ratchet-wheel 38, thus disengaging the oscillating arm 36 operatively from the shaft 37. When the cam 166 is in contact with the stud-bearing 165 and the arm 36 continues to oscillate, the roller of the stud-bearing 165 will travel reciprocably on the curved apex of the cam 166. The rod 163 is held yieldingly upwardly out of action when not in engagement with the cam 166 by the spring 167, attached thereto and to the arm 36.

Horizontally-disposed rails 168, secured to the frame, serve as ways on which the carrier is supported and travels at the locality of inserting match-sticks therein and opposite to the drum 49. Similar rails 169, secured to the frame, also serve as ways for the support and travel thereon of the carrier at the locality of discharging the matches and opposite the punches 132.

What I claim as my invention is—

1. In a match-machine, an endless match-carrier comprising a series of perforated match-carrying transverse bars, and links securing said bars together flexibly each bar having a set of links secured rigidly to it, an adjacent bar being revoluble in the same set of links.

2. In a match-machine, an endless match-carrier comprising a series of independent perforated match-carrying transverse bars, said bars being alternately long and short the extremities of the longer bars projecting laterally beyond the ends of the short bars and serving as teeth to be engaged by toothed driving-wheels, and links securing said bars together flexibly.

3. In a match-machine, an endless match-carrier comprising a series of long and short round transverse bars, said bars severally having a single series of diametrically-disposed apertures for taking and holding matchsticks, and links in pairs one at each extremity of the bars pierced by two adjacent bars one of which bars is secured rigidly in said links and the other of which two bars is revoluble in said links.

4. In a match-machine, an endless match-carrier comprising a series of long and short perforated independent match-carrying transverse bars, the long bars projecting laterally at both extremities beyond the short bars, links securing the bars together flexibly, and driven toothed wheels meshing with the long bars of the carriers and adapted thereby to move the carrier forward.

5. In a match-machine, an endless flexible match-carrier, driving-wheels geared to one portion of the carrier adapted to move that portion of the carrier continuously, other driving-wheels geared to another portion of the carrier adapted to move that other portion of the carrier intermittently, permanently-located idle-pulleys supporting the carrier in part and other pulleys D D² located at the junctions of those portions of the carrier that move differentially, and spring-supported yielding arms in which said last-mentioned pulleys are mounted and support the carrier yieldingly at those localities.

6. In a match-machine, the combination with an endless flexible match-carrier, of two sets of driving-wheels at a distance apart meshing with and adapted to move a portion of the carrier intermittingly, three sets of idle-pulleys, one set D² in front of said sets of driving-wheels, another set D³ between the two sets of driving-wheels, and the remaining set D behind said driving-wheels, and spring-supported yielding arms on which said three sets of pulleys are severally mounted, said pulleys being adapted to support the carrier thereon yieldingly.

7. In a match-machine, the combination with an endless flexible match-carrier supported chiefly on permanently-located ways and revoluble idle-pulleys, of a set of pulleys I about which the carrier runs substantially reversing its direction to and from the pulley, pulley-supports adjustable at a right angle to the general direction of the carrier toward and from said adjustable pulleys, means for adjusting said supports, and an adjacent set of carrier-supporting pulleys D' mounted in spring-retained swinging arms on which last-mentioned pulleys D' the carrier runs next after running on the adjustable pulleys I.

8. In a match-machine, the combination with a composition-supplying roller, of an endless flexible match-carrier, a set of pulleys near to and above said roller on which said carrier travels, arms movable vertically on ways on the frame in which arms said pulleys are mounted, a vertically-disposed rack on the frame, and a pinion mounted in said arms and meshing with said rack adapted to lift the carrier vertically directly away from said roller.

9. In a match-machine, the combination with a pan adapted to hold an inflammable material, and a flexible match-carrier running above and adjacent to the pan, of a set of pulleys above and adapted to depress the carrier opposite the pan, a rock-shaft having radial arms in which said pulleys are mounted, a crank-arm on said rock-shaft, a horizontally-disposed shiftable bar 14, an obliquely-disposed rod connecting said bar to said crank, and an opposite reversely obliquely-disposed rod connecting said shiftable bar to the frame, by which said rock-shaft may be rotated limitedly and said pulleys be raised and lowered.

10. In a match-machine, the combination with an endless flexible traveling carrier consisting of transverse match-carrying bars so constructed and arranged as to form thereof a continuous series of cog-teeth-engaging means at regular and equal distances apart throughout the length of the endless carrier, of a driving-shaft, shafts and gears connecting the driving-shaft directly to a portion of the carrier whereby that portion of the carrier is caused to travel continuously, an auxiliary intermittingly-moving shaft 37 geared to another portion of said carrier, a ratchet-wheel fixed on said shaft, an oscillating arm loose on the shaft, a spring-actuated pawl pivoted on the arm engaging the ratchet-wheel, and a rod pivoted eccentrically on the oscillating arm and to a crank on the driving-shaft, whereby the entire carrier a portion of it at a time is adapted to be moved regularly equal distances and intermittingly.

11. In a match-machine, the combination with a driving-shaft journaled in the frame, of an auxiliary shaft 37, a ratchet-wheel fixed on said auxiliary shaft, an oscillating arm loose on the auxiliary shaft, a pawl pivoted on the oscillating arm and engaging the ratchet-wheel, a rod connecting a crank on the driving-shaft to the oscillating arm, a third shaft 41 geared to the auxiliary shaft, a worm on said third shaft, a fourth shaft 44 having a worm-wheel meshing with said worm, short shafts 45, 46, respectively geared to said fourth shaft and to shafts 47, 48, said shafts 47 and 48 at a distance apart and provided with toothed wheels, and an endless flexible carrier engaged by said toothed wheels, whereby a considerable portion of said carrier is driven synchronously intermittingly.

12. In a match-machine, the combination with an endless flexible carrier, match-discharging mechanism, stick-sticking mechanism at a distance from and following the match-discharging mechanism in the line of travel of the carrier and through which mechanisms the carrier travels, means for moving these mechanisms and the carrier between and past these mechanisms intermittingly and synchronously, and a set of pulleys supported yieldingly on which the carrier travels and by which it is held taut between said mechanisms in the path of its intermitting movement.

13. In a match-machine, the combination with a movable cutter-frame having therein a bed-plate, of cutter-bars fitted and slidable endwise in grooves in said bed-plate, pins inserted loosely through said cutter-bars into sockets in the bed-plate holding the cutter-bars against endwise movement, and a locking-plate hinged to said frame and resting normally on the pins holding them releasably in place.

14. In a match-machine, the combination with a pan for holding a semiliquid and ignitible composition, of a roller located partly in the pan, oscillating paddles in the pan below the roller, said paddles being suspended on radial arms fixed in hubs concentric with the roller, and means for oscillating the paddles.

15. In a match-machine, the combination with a pan for holding a semiliquid ignitible composition, of a roller located partly in the pan, oscillating paddles in the pan below the roller, said paddles being suspended on radial arms fixed in hubs concentric with the roller, a crank-arm rigid to one of said hubs, a connecting-rod, and a driven shaft provided with an eccentric wrist to which said connecting-rod is pivoted.

16. In a match-machine, the combination with a traveling and intermittingly-resting match-carrier, of a frame so mounted as to be movable in a plane at a right angle to the travel of the carrier adjacent thereto, punches fixed in said movable frame and so disposed as to be capable of entering stick-apertures in said carrier from the rear side, a spring acting on said frame adapted to move said frame forward quickly and with an initially strong action and thrust the punches through the apertures in the carrier forcing the matches therefrom, and means for forcing the frame rearwardly against the constant action of the spring and holding the frame in such rear position except during temporary intervals when released therefrom.

17. In a match-machine, the combination with a traveling and intermittingly-resting match-carrier, of a punch-carrying frame reciprocable in a plane at a right angle to the carrier, a spring acting on said frame adapted to force the punches in said frame quickly and with an initially strong action to their work, a lever-arm 138 pivoted to the match-frame at one extremity and connected to said punch-frame at the other extremity, and a revoluble cam bearing against said lever-arm medially adapted to force said frame and punches away from the carrier against the action of said spring except at intervals intermittingly.

18. In a match-machine, the combination with a reciprocating frame and a series of punches fixed therein and reciprocating therewith, of an adjustable punch-guide comprising two plate members each provided with sets of opposite and overlapping teeth and registering interdental spaces through which spaces the punches pass, said plate members being adjustable on their support toward and from each other.

In testimony whereof I affix my signature in presence of two witnesses.

WILLIAM H. WUSSOW.

Witnesses:
LOUIS F. WUSSOW,
C. T. BENEDICT.